US011959252B2

(12) United States Patent
Caldwell et al.

(10) Patent No.: US 11,959,252 B2
(45) Date of Patent: Apr. 16, 2024

(54) HYDRAULIC APPARATUS AND OPERATING METHOD

(71) Applicant: Artemis Intelligent Power Limited, Loanhead Midlothian (GB)

(72) Inventors: Niall Caldwell, Loanhead Midlothian (GB); Uwe Stein, Loanhead Midlothian (GB); Jill Macpherson, Loanhead Midlothian (GB); Matthew Green, Loanhead Midlothian (GB); Callan MacKay, Loanhead Midlothian (GB)

(73) Assignee: ARTEMIS INTELLIGENT POWER LIMITED, Loanhead (GB)

( * ) Notice: Subject to any disclaimer, the term of this patent is extended or adjusted under 35 U.S.C. 154(b) by 240 days.

(21) Appl. No.: 17/640,143

(22) PCT Filed: Sep. 3, 2020

(86) PCT No.: PCT/GB2020/052110

§ 371 (c)(1),
(2) Date: Mar. 3, 2022

(87) PCT Pub. No.: WO2021/044148

PCT Pub. Date: Mar. 11, 2021

(65) Prior Publication Data

US 2022/0333620 A1 Oct. 20, 2022

(30) Foreign Application Priority Data

Sep. 3, 2019 (GB) .................................. 1912665.5

(51) Int. Cl.

| | |
|---|---|
| ***E02F 9/22*** | (2006.01) |
| ***F04B 1/053*** | (2020.01) |
| ***F04B 49/03*** | (2006.01) |
| ***F04B 49/06*** | (2006.01) |
| ***F04B 49/22*** | (2006.01) |
| ***F15B 11/042*** | (2006.01) |
| ***F15B 11/17*** | (2006.01) |

(52) U.S. Cl.
CPC .............. *E02F 9/2242* (2013.01); *E02F 9/22* (2013.01); *F04B 1/053* (2013.01); *F04B 49/03* (2013.01);
(Continued)

(58) Field of Classification Search
CPC ....... F15B 11/165; F15B 11/17; E02F 9/2239; E02F 9/2242
See application file for complete search history.

(56) References Cited

U.S. PATENT DOCUMENTS 4,024,710 A * 5/1977 Zelle .................... B62D 11/183 60/449
5,890,303 A 4/1999 Ishikawa et al.
(Continued)

FOREIGN PATENT DOCUMENTS

DE 102011112385 A1 3/2012
EP 2746466 B1 1/2021
EP 4257829 A1 * 10/2023 ............ E02F 9/2235

OTHER PUBLICATIONS

International Search Report & Written Opinion, for Application No. PCT/GB2020/052110, dated Dec. 22, 2020.

*Primary Examiner* — Michael Leslie
(74) *Attorney, Agent, or Firm* — SNELL & WILMER L.L.P.

(57) ABSTRACT

A hydraulic apparatus has a plurality of pump modules each of which is formed by a plurality of working chambers having a common high pressure manifold. A connecting circuit switchably connects pump modules to first and second hydraulic circuit portions to allocate capacity as first and second demands for hydraulic fluid vary. In an apparatus which may have two or more connecting circuit outputs, valves may be controlled or working chamber pumping cycles made inactive to facilitate the reallocation of a pump module from one output to another, and a control strategy
(Continued)

addresses pump module allocation when the demands for hydraulic fluid exceed available capacity.

21 Claims, 20 Drawing Sheets

(52) U.S. Cl.
CPC .............. *F04B 49/06* (2013.01); *F04B 49/22* (2013.01); *F15B 11/042* (2013.01); *F15B 11/17* (2013.01); *F15B 2211/20576* (2013.01); *F15B 2211/6654* (2013.01); *F15B 2211/7142* (2013.01)

(56) References Cited

U.S. PATENT DOCUMENTS

| | | | | |
|---|---|---|---|---|
| 5,940,997 | A | 8/1999 | Toyooka et al. | |
| 5,996,341 | A * | 12/1999 | Tohji | E02F 9/2235 60/429 |
| 8,235,676 | B2 * | 8/2012 | Armstrong | F04C 14/065 418/1 |
| 8,731,727 | B2 | 5/2014 | Toppari et al. | |
| 9,194,107 | B2 | 11/2015 | Andruch, III et al. | |
| 9,481,975 | B2 | 11/2016 | Saotome | |
| 10,161,423 | B2 * | 12/2018 | Rampen | F15B 11/162 |
| 10,180,135 | B2 * | 1/2019 | Caldwell | F15B 7/006 |
| 10,415,215 | B2 | 9/2019 | Takahashi et al. | |
| 11,022,153 | B2 * | 6/2021 | Green | F04B 1/16 |
| 11,137,330 | B2 | 10/2021 | Rampen et al. | |
| 11,162,514 | B2 | 11/2021 | Rampen et al. | |
| 2006/0277905 | A1 | 12/2006 | Matsumoto | |
| 2011/0017308 | A1 * | 1/2011 | Linjama | F04B 7/0076 137/565.11 |
| 2013/0319561 | A1 | 12/2013 | Helbling et al. | |
| 2016/0017898 | A1 | 1/2016 | Kanenawa et al. | |
| 2017/0009753 | A1 | 1/2017 | Pfaff et al. | |
| 2017/0306936 | A1 | 10/2017 | Dole et al. | |
| 2023/0340968 | A1 * | 10/2023 | Gappmaier | E02F 9/2225 |

* cited by examiner

HYDRAULIC APPARATUS AND OPERATING METHOD

FIELD OF THE INVENTION

The invention relates to the field of providing multiple pumped flows of hydraulic fluid to actuator circuits in hydraulic machines such as vehicles (for example excavators) or industrial machines (e.g. injection moulding machines, waterjet cutting machines).

BACKGROUND TO THE INVENTION

At the present time, it is common for the hydraulic actuators of a conventional excavator to be driven by two pumps in tandem (the first and second pumps), with the pumps being driven by the same prime mover. Typically, there are first and second hydraulic circuit portions, each hydraulic circuit portion extending from a hydraulic fluid input, to a group of actuators (first and second groups of actuators). The hydraulic fluid inputs of the first and second hydraulic circuit portions are connected to and receive fluid from first and second pumps (with a one to one correspondence) so that the first and second groups of actuators receive pressurised hydraulic fluid from different pumps during normal operation. Each hydraulic fluid circuit portion distributes hydraulic fluid to individual actuators within the respective group of actuators, for example by using proportional valves connected in series, which divert a controllable amount of hydraulic fluid to an actuator. Single actuators with two ports which receive fluid to actuate in opposite directions (e.g. left and right slew functions) may be connected to different outputs of the same proportional valve. The pressures of fluid at the hydraulic fluid circuit portion inputs may be controlled to be different, for example due to different requirements (e.g. flow rate) of the relevant actuators. It is known that under some circumstances the flow requirements of the actuators will become sufficiently high that it is advantageous to combine the flow from both pumps to temporarily drive one or both groups of actuators using pressurised fluid from both pumps and it is known to provide one or more controllable valves for this purpose. This can be seen for example in U.S. Pat. No. 5,940,997 (Hitachi) in which proportional valves 10 and 8 (Arm I' and 'Arm II') can be switched to combine flow for peak flow to the arm actuator and proportional valves 7 and 11 (Boom I' and 'Boom II') can be switched to combined flow for peak flow to the boom actuator. Without the controllable valves for performing the combining function, the pumps would respectively require higher specifications to provide maximum flow rate and pressure and this would lead to a less efficient machine.

We have found that the above approach is not energy efficient in practice, especially where the groups of actuators connected to the different hydraulic circuit portions have different fluid supply requirements. If for example the actuators of the first group require hydraulic fluid at a relatively high pressure but relatively low flow rate while the actuators of the second group require hydraulic fluid at a relatively low pressure and a relatively high flow rate, then when the pump outputs are combined by the merging valves, there is a requirement for the pumps to deliver both the relatively high fluid pressure (the highest required pressure) and relatively high flow rate. This leads to a substantial loss of energy due to a requirement to throttle the fluid to the hydraulic circuit portion requiring the lower pressure through an orifice, such as a passageway in a spool valve.

We have also found that this scenario is quite common, for example when an excavator is scraping a road and requires that the excavator arm is moved quickly at low pressure and the boom is raised slowly at high pressure. Accordingly, the existing strategy of combining flow with a mixing valve can be wasteful of energy and embodiments of the invention seek to provide a more efficient controlled flow of hydraulic fluid to different hydraulic circuit portions with respective groups of actuators.

Some aspects of the invention address problems relating to the control of pumps during transitions from directing hydraulic fluid to one group of actuators to directing hydraulic fluid to another group of actuators.

SUMMARY OF THE INVENTION

According to a first aspect of the invention there is provided an apparatus comprising: first and second hydraulic circuit portions,

- the first hydraulic circuit portion having a first hydraulic circuit portion input, and a plurality of valves configured to regulate the flow of hydraulic fluid from the first hydraulic circuit portion input to each of a first group of at least two (and typically at least three) hydraulic actuators,
- the second hydraulic circuit portion having a second hydraulic circuit portion input, and a plurality of valves configured to regulate the flow of hydraulic fluid from the second hydraulic circuit portion input to each of a second group of at least two (and typically at least three) hydraulic actuators,
- a prime mover,
- a hydraulic machine having a rotatable shaft in driven engagement with the prime mover and comprising at least three working chambers having a volume which varies cyclically with rotation of the rotatable shaft, each working chamber of the hydraulic machine comprising a low-pressure valve which regulates the flow of hydraulic fluid between the working chamber and a low-pressure manifold and a high-pressure valve which regulates the flow of hydraulic fluid between the working chamber and a high-pressure manifold, wherein the working chambers are formed into a plurality of pump modules, each pump module comprising a group of one or more of the working chambers and a high-pressure manifold which is common to each working chamber in the group,
- a hydraulic connecting circuit comprising a plurality of connecting circuit inputs, each of which is in fluid communication with the high-pressure manifold of a respective pump module, a first connecting circuit output in fluid communication with the first hydraulic circuit portion input (i.e. of the first hydraulic circuit portion) and a second connecting circuit output in fluid communication with the second hydraulic circuit portion input (i.e. of the second hydraulic circuit portion), the hydraulic connecting circuit configured to connect each said connecting circuit output to a said hydraulic circuit portion input and comprising a plurality of valves which are (e.g. electronically) switchable (typically under the control of the controller) to change the connecting circuit output to which a said hydraulic circuit portion input is connected, so that each pump module is connected to one hydraulic circuit portion at a time and that for some or all of the pump modules, the hydraulic circuit portion to which the respective pump module is connected may be changed, a controller configured to actively control at least the low pressure valves (and in some embodiments also the high pressure valves) of the said working chambers to determine whether each working chamber undergoes either an active cycle, with a net displacement of working fluid between the low-pressure manifold and the high-pressure manifold of the working chamber, or an inactive cycle, with no net displacement of working fluid between the low-pressure manifold and the high-pressure manifold of the working chamber, and also the said valves, such that the net displacement of the working chambers of each pump module which are connected to the first hydraulic circuit portion is controlled in response to a first demand for hydraulic fluid of the first hydraulic circuit portion and the net displacement of the working chambers of each pump module which are connected to the second hydraulic circuit portion is controlled in response to an independent second demand for hydraulic fluid of the second hydraulic circuit portion.

The invention extends in a second aspect to a method of operating an apparatus, the apparatus comprising:

first and second hydraulic circuit portions, the first hydraulic circuit portion having a first hydraulic circuit portion input, and a plurality of valves configured to regulate the flow of hydraulic fluid from the first hydraulic circuit portion input to each of a first group of at least two (and typically at least three) hydraulic actuators, the second hydraulic circuit portion having a second hydraulic circuit portion input, and a plurality of valves configured to regulate the flow of hydraulic fluid from the second hydraulic circuit portion input to each of a second group of at least two (and typically at least three) hydraulic actuators, a prime mover, a hydraulic machine having a rotatable shaft in driven engagement with the prime mover and comprising at least three working chambers having a volume which varies cyclically with rotation of the rotatable shaft, each working chamber of the hydraulic machine comprising a low-pressure valve which regulates the flow of hydraulic fluid between the working chamber and a low-pressure manifold and a high-pressure valve which regulates the flow of hydraulic fluid between the working chamber and a high-pressure manifold, wherein the working chambers are formed into a plurality of pump modules, each pump module comprising a group of one or more of the working chambers and a high-pressure manifold which is common to each working chamber in the group, a hydraulic connecting circuit comprising a plurality of connecting circuit inputs, each of which is in fluid communication with the high-pressure manifold of a respective pump module, a first connecting circuit output in fluid communication with the first hydraulic circuit portion input (i.e. of the first hydraulic circuit portion) and a second connecting circuit output in fluid communication with the second hydraulic circuit portion input (i.e. of the second hydraulic circuit portion), the hydraulic connecting circuit configured to connect each said connecting circuit output to a said hydraulic circuit portion input and comprising a plurality of valves which are (e.g. electronically) switchable (typically under the control of the controller) to change the connecting circuit output to which a said hydraulic circuit portion input is connected, so that each pump module is connected to one hydraulic circuit portion at a time and that for some or all of the pump modules, the hydraulic circuit portion to which the respective pump module is connected may be changed, the method comprising:

actively controlling (e.g. by a controller) at least the low pressure valves (and in some embodiments also the high pressure valves) of the said working chambers to determine whether each working chamber undergoes either an active cycle, with a net displacement of working fluid between the low-pressure manifold and the high-pressure manifold of the working chamber, or an inactive cycle, with no net displacement of working fluid between the low-pressure manifold and the high-pressure manifold of the working chamber, and also the said valves, such that the net displacement of the working chambers of each pump module which are connected to the first hydraulic circuit portion is controlled in response to a first demand for hydraulic fluid of the first hydraulic circuit portion and the net displacement of the working chambers of each pump module which are connected to the second hydraulic circuit portion is controlled in response to an independent second demand for hydraulic fluid of the second hydraulic circuit portion, and changing the hydraulic circuit portion to which a pump module is connected by switching one or more said valves of the hydraulic connecting circuit.

The hydraulic connecting circuit functions to apportion hydraulic fluid from the pump modules to the hydraulic circuit portions. By connected we refer to fluidically connected.

The working chambers which make up each pump module need not be adjacent. Typically each pump module has a high-pressure manifold which is the high-pressure manifold to which each working chamber in the group is connected (through a high pressure valve). Thus, the pump modules may make a displacement of working fluid through their respective high-pressure manifold, into the connecting circuit input and thus to a connecting circuit output (depending on the setting of the valves in hydraulic connecting circuit) and thereby to a hydraulic circuit portion input, which displacement is independent of each other pump module.

Typically, the high-pressure manifolds of the pump modules are separate to each other, at least during normal operation. (The low-pressure manifolds may be common to all working chambers with no effect on operation). Typically, the working chambers of the pump modules connected to the different connecting circuit outputs are controlled based on separate demand signals. The working chambers connected to the first and second connecting circuit outputs may therefore be controlled to have independent output pressures and flow rates and one or more pump modules (and so their respective working chambers) may be swapped between being connected to the first connecting circuit output and being connected to the second connecting circuit output.

The first and second demands for hydraulic fluid are signals indicative of a demand for hydraulic fluid by the first and second hydraulic circuit portions, to provide fluid for their respective actuators. The first and second demands (and any third or further demands) may be demands for pressure or flow rate of hydraulic fluid. It may be that the first and second hydraulic circuit portions, and/or one or more actuators of the first and second groups of actuators respectively comprise sensors, for example pressure or flow sensors or, in the case of actuators, position, speed or acceleration sensors. It may be that the demands are calculated from the output of these sensors. It may be that the demands are calculated from user operable controls, for example, an electrical signal (analogue or digital) or hydraulic pressure from a user interface (e.g. touch screen controller) or manually operated control, such as a joystick or handle. The demand may be calculated from proportional valve control signals (which in respect of the invention can optionally be used to control a proportional valve comprised within a respective hydraulic circuit portion (this is the conventional method of control), or not). The demands may be calculated from signals received (whether from a user or from an electronic controller) through an electric communications network such as a CAN (controller area network). The first and second (and any third or further) demands are independent of each other, to enable the first and second hydraulic circuit portions, and the actuator connected to them, to be independently controlled. Typically, the first and/or second demands are determined taking into account the requirement of two or more actuators within the respective group of actuators.

Accordingly, the pressure of hydraulic fluid at the first hydraulic circuit portion input and the pressure of hydraulic fluid at the second hydraulic circuit portion input can be independently varied. The rate of flow of hydraulic fluid into the first hydraulic circuit portion (through the first hydraulic circuit portion input and to the first group of actuators) and the rate of flow of hydraulic fluid into the second hydraulic circuit portion (through the second hydraulic circuit portion input and to the second group of actuators) may be independently varied. Furthermore, as changes may be implemented for each cycle of working chamber volume, the pressures and flow rates may be rapidly varied. However, the individual pump modules can be reallocated from the first to the second hydraulic circuit portion, or vice versa, enabling a greater or lesser number of them to be used together where required.

The net displacement of the working chambers of a pump module which is switched to being connected to a hydraulic circuit portion are controlled to meet the demand for hydraulic fluid by the hydraulic circuit portion. The net displacement of the working chambers of a pump module which is switched to no longer be connected to a respective connecting circuit output are no longer controlled to meet the demand for hydraulic fluid by the respective hydraulic circuit portion. The net displacement of the working chambers of each pump module which are connected to a respective hydraulic circuit portion are controlled in combination to meet the demand for hydraulic fluid by the hydraulic circuit portion.

As a result of these features, the apparatus operates efficiently, without the loss of power which would occur if the outputs of the first and second pump modules were combined with a mixing valve and fed directly to the inputs of both of the first and second hydraulic circuit portions.

Furthermore, the apparatus may usefully be formed by retrofitting into or modification of existing hydraulic apparatus which has first and second hydraulic circuit portions, with separate first and second hydraulic circuit portion inputs, each of which has a plurality of hydraulic actuators, and thus the first and second circuit portions and actuators may not need to be modified.

The first and second hydraulic circuit portions each comprise at least two (and typically at least three actuators). They typically each comprise one or more (typically a plurality of) flow splitting valves which direct a selectable portion of received hydraulic fluid to different actuators within the respective group of actuators. The flow splitting valves are typically proportional valves. Typically, each hydraulic circuit portion provides at least two, or typically at least three, independently controllable supplies of hydraulic fluid to different actuators.

It may be the first hydraulic circuit portion comprises a first valve block portion and the second hydraulic circuit portion comprises a second valve block portion. A or each valve block portion may be a part of a metal block within which valves are located. The first and second valve block portions may each comprise a port which functions as the first or second hydraulic circuit portion input respectively.

It may be that the hydraulic connecting circuit comprises a valve block (e.g. a block comprising switching valves) fitted to the hydraulic machine. This enables convenient connection of the pump modules to the hydraulic circuit portions.

It may be that the said valves are diverting valves which are electronically controllable to connect the high-pressure port of a pump module exclusively to either the first connecting circuit output or to the second connecting circuit output. It may be that the valves are diverting valves and the method comprises switching a said diverting valve to switch a pump module from being connected exclusively to the first connecting circuit output to being connected exclusively to the second connecting circuit output, or vice versa. This arrangement can be implemented safely and reliably despite the switching of working chambers between the first and second pump modules. The risk of hydraulic deadheading due to blocking flow at the valve, is largely avoided. It may be each connecting circuit input (for fluid from a pump module) is connectable to the first or second connecting circuit output (and thus to the first or second hydraulic circuit portion) through respective first and second valves (of the hydraulic connecting circuit) which are controlled such that only one or the other is open at a given time. Each connecting circuit input may be connectable to the first or second connecting circuit output through a single diverting valve operable between a first position in which the (first or second) connecting circuit input is connected to the first connecting circuit output and a second position in which the (first or second) connecting circuit input is connected to the second connecting circuit output.

The one or more working chambers within each respective pump module are connected together. Each pump module may be a pump module which has a common output of hydraulic fluid to (a connecting circuit input of) the hydraulic connecting circuit. The method comprises regulating the net displacement of working fluid by each pump module. Typically, the controller is operable to regulate the net displacement of working fluid by each pump module. Typically, the hydraulic machine comprises a plurality of pump modules, each pump module comprising a respective group of one or more working chambers which have a common high pressure manifold through which they are connected to the hydraulic connecting circuit.

It may be that the controller controls at least the low pressure valves of the working chambers to determine whether each working chamber undergoes either an active cycle, with a net displacement of working fluid between the low-pressure manifold and the high-pressure manifold of the working chamber, or an inactive cycle, with no net displacement of working fluid between the low-pressure manifold and the high-pressure manifold of the working chamber, for each cycle of working chamber volume. The method may comprise controlling at least the low pressure valves of the working chambers to determine whether each working chamber undergoes either an active cycle, with a net displacement of working fluid between the low-pressure manifold and the high-pressure manifold of the working chamber, or an inactive cycle, with no net displacement of working fluid between the low-pressure manifold and the high-pressure manifold of the working chamber, for each cycle of working chamber volume. It may be that in at least some circumstances (for example when a demand remains within at least one range of values) the working chamber intersperses active and inactive cycles (typically the controller causes a working chamber to intersperse active and inactive cycles).

It may be that the high-pressure manifold of each pump module is selectively connectable (and in use is selectively connected) only to the input of a first hydraulic circuit portion or a second hydraulic circuit portion. Thus there may be only two said hydraulic circuit portions. However, it may be that the apparatus comprises one or more further hydraulic circuit portions (nth hydraulic circuit portions, for example a third hydraulic circuit portion), each further hydraulic circuit portion having a respective hydraulic circuit portion input (nth (e.g. third) hydraulic circuit portion input), and one or more further hydraulic actuators (e.g. a group of one or more further hydraulic actuators, the nth (e.g. third) group of one or more hydraulic actuators). One or more (or each) further hydraulic circuit portion may further comprise one or more valves configured to regulate the flow of hydraulic fluid from the respective hydraulic circuit portion input to each of a respective further group of one or more (optionally at least two or typically at least three) hydraulic actuators.

The controller may control at least the low-pressure valves of the said working chambers such that the net displacement of the working chambers of each pump module which are connected to a respective further (nth, e.g. third) hydraulic circuit portion are controlled in response to a respective further (nth, e.g. third) demand for hydraulic fluid. The method may comprise controlling at least the low-pressure valves of the said working chambers such that the net displacement of the working chambers of each pump module which are connected to a respective further (nth, e.g. third) hydraulic circuit portion are controlled responsive to a respective further (nth, e.g. third) demand for hydraulic fluid. There may be a respective further sensor (nth (e.g. third) sensor) configured to measure a property of hydraulic fluid in the respective hydraulic circuit portion (nth (e.g. third) hydraulic circuit portion) or a property of one or more of the respective group of actuators (nth (e.g. third) group of actuators), which measurement is used to generate the nth (e.g. third) demand. The hydraulic connecting circuit may further comprise, for each further hydraulic circuit portion, a further connecting circuit output (nth (e.g. third) connecting circuit output) in fluid communication with the respective hydraulic circuit portion input (nth (e.g. third) hydraulic circuit portion input), wherein the plurality of valves of the hydraulic connecting circuit are (e.g. electronically) switchable to connect the high pressure manifold of each respective pump module to one or another of the connecting circuit outputs at time (first connecting circuit output, second connecting circuit output and one or more further connecting circuit outputs).

It may be that the hydraulic connecting circuit is configured such that each pump module may be connected exclusively to one hydraulic circuit portion at a time, wherein one or more pump modules may be connected to a said further hydraulic circuit portion. Typically, the hydraulic connecting circuit is configured such that each pump module is connectable to the first or second hydraulic circuit portion and at least one pump module is connectable to each hydraulic circuit portion input, and typically the hydraulic connecting circuit is configured such that at any given time each pump module is connected exclusively to one of the hydraulic circuit portions to which is it connectable. The controller may control at least the low-pressure valves of the said working chambers such that the net displacement of the working chambers of each pump module which are connected to a further (nth, e.g. third) hydraulic circuit portion are controlled in response to a further (nth, e.g. third) demand for hydraulic fluid. The method may comprise controlling at least the low-pressure valves of the said working chambers such that the net displacement of the working chambers of each pump module which are connected to a further (nth, e.g. third) hydraulic circuit portion are controlled responsive to a further (nth, e.g. third) demand for hydraulic fluid.

It may be that the hydraulic connecting circuit is (e.g. electronically) switchable to connect some or all of the further hydraulic circuit portion inputs to only some of the one or more pump modules. Typically, there are however fewer said hydraulic circuit portions with independent inputs (the first and second hydraulic circuit portions plus any further said hydraulic circuit portions), than there are pump modules with individual high pressure manifolds.

As mentioned above, the first and second hydraulic circuit portions typically comprise first and second valve blocks. The circuit portions (typically the valve blocks) each include at least one proportional valve which is controllable to divert a proportion of working fluid received by the hydraulic circuit portion to one or more actuators. It may be that for one or more said further hydraulic circuits the connecting circuit is operable to connect the high pressure manifold of one or more pump modules directly to a hydraulic actuator. It may be that for one or more said further hydraulic circuits the connecting circuit is operable to connect the high pressure manifold of one or more pump modules to a hydraulic actuator without an intervening proportional flow valve. It may be that the controller is operable to select the net displacement of working chambers which are connected to the said hydraulic actuator in response to a demand signal related to a target position, rate of movement or force of the said hydraulic actuator. The method may comprise selecting the net displacement of working chambers which are connected to the said hydraulic actuator responsive to a demand signal related to a target position, rate of movement or force of the said hydraulic actuator. Thus, the hydraulic actuator might be directly controlled by variation in the displacement of one or more pump modules, whilst the connecting circuit may instead divert the flow of fluid from the one or more groups of working chamber to the first or second hydraulic circuit portions, typically where a portion of the fluid flow will pass through one or more proportional flow valves.

It may be that the first and/or second hydraulic circuit portions further comprise a hydraulic conduit which provides a pathway for hydraulic fluid to flow from the hydraulic circuit portion input to at least one actuator of the hydraulic circuit portion (typically not all of the actuators included in the respective hydraulic circuit portion) not through proportional valves of the hydraulic circuit portion and an electronically controllable bypass valve which selectively (typically under the control of the controller) allows flow of fluid through the hydraulic conduit such that the said at least one actuator may be selectively provided with hydraulic fluid from the hydraulic circuit portion input via one or more proportional valves or through the hydraulic conduit and optionally both. The method may comprise operating a bypass valve to cause fluid received by an input of the first and/or second hydraulic circuit portion to flow to at least one actuator of the hydraulic circuit portion other than through proportional valves of the hydraulic circuit portion. Accordingly the said at least one actuator may be selectively driven directly by received fluid. This is advantageous at time of high flow requirement by the said at least one actuator as it reduces or avoids losses of energy through proportional valves and/or enables a greater flow rate of hydraulic fluid to the at least one actuator, when required. One alternative to installing a bypass valve would be to swap the existing proportional valve with a larger capacity proportional valve such that the throttling loss is not significant for the maximum flow capacity. In the standard excavator, the flow to an actuator may be supplied by two proportional valves, however, in a design according to the present application, only one proportional valve would service this actuator. The bypass valve is required to provide full flow without significant throttling losses. The bypass valve may be opened to allow flow through the hydraulic conduit when the demand for fluid by the at least one actuator, or by the hydraulic circuit portion, exceeds a threshold demand, which threshold demand typically requires more than half of the pump modules to meet. The flow pathway through at least one proportional valve to the at least one actuator may be closed when the bypass valve is opened. This may be achieved by closing or moving the position of the proportional valve (under the control of the controller) either directly using an actuator or by adjusting the pressure of a control (e.g. pilot) hydraulic connection of the proportional valve. The hydraulic conduit and bypass valve may be separate to the main valve block or may be integrated in which case the bypass valve will typically have a large cross sectional area when open than the proportional valve which would otherwise regulate the flow of hydraulic fluid to the at least one actuator.

It may be that the apparatus is configured (e.g. the controller is programmed) such that when a pump module is switched from being connected to one hydraulic circuit portion to another hydraulic circuit portion (when a connecting circuit input is switched from one to another connecting circuit output), the working chambers of the respective pump module are caused to carry out (only) inactive cycles while the valves are switched. The method may comprise the step of causing the working chambers of a pump module to carry out (only) inactive cycles while the valves of the hydraulic connecting circuit are switched to connect the pump module to a different hydraulic circuit portion. It may be that while valves associated with a pump module are being switched, the working chambers are not caused to start any active cycles (e.g. by closure of their low pressure valves). The method may comprise the step of causing the working chambers of a pump module to not start any active cycles while the valves of the hydraulic connecting circuit are switched to connect the pump module to a different hydraulic circuit portion. Typically in at least some circumstances they would otherwise have carried out active cycles.

It may be that the apparatus is configured (e.g. the controller is programmed) such that when the hydraulic circuit portion to which a pump module is connected is changed, the working chambers of the respective pump module are caused to carry out additional active cycles in order to increase the pressure in the high pressure manifold of the pump module before the switchable valves are switched. The method may comprise causing the working chambers of a pump module to carry out additional active cycles in order to increase the pressure in the high pressure manifold of the pump module before the valves of the hydraulic connecting circuit are switched to connect the pump module to a different hydraulic circuit portion.

It may be that the high pressure manifold of some or all pump modules are connected to the first hydraulic circuit portion through a first valve and to the second hydraulic circuit portion through a second valve. It may be that the controller staggers switching of the first and second valves, to avoid both being closed at the same time. The method may comprise staggering the switching of the first and second valves, to avoid both being closed at the same time. It may be that one of the first and second valves is a normally open valve and the other is a normally closed valve. These features reduce the risk of hydraulic deadhead. It may be taken into account that the normally open valve will open more quickly than it will close, and vice versa for the normally closed valve, when controlling the timing of switching the first and second valves and/or causing one or more working chambers to carry out inactive cycles while changing the hydraulic circuit portion to which a pump module is connected.

It may be that the hydraulic connecting circuit comprises a conduit extending between the first and second connecting circuit outputs and having a plurality of fluid junctions along the length of the conduit, each fluid junction connecting to a different connecting circuit input, and a plurality of blocking valves controllable (typically by the controller) to selectively block the conduit and thereby determine which connecting circuit inputs are connected to which connecting circuit outputs (and therefore which pump modules are connected to which hydraulic circuit portions). The method may comprise controlling said blocking valves to thereby determine which connecting circuit inputs are connected to which connecting circuit outputs. The conduit may extend from the first connecting circuit output to the second connecting circuit output and back to the first connecting circuit output in a closed loop, with said junctions and blocking valves distributed around the loop. The conduit may be located within the endplate of the hydraulic machine. The junctions may be junctions with axial conduits within the hydraulic machine which are parallel to the axis of rotation of the rotatable shaft.

It may be that the hydraulic connecting circuit comprises a first manifold portion (which may be the first apportioning manifold or part thereof) extending to the first connecting circuit output, a second manifold portion (which may be the second apportioning manifold or part thereof) extending to the second connecting circuit output and a third manifold portion extending to a third connecting circuit output, connected to the input of a third hydraulic circuit portion comprising a third group of one or more actuators, and a switching manifold portion, wherein at least the first manifold portion, the second manifold portion and the switching manifold portion are each selectively connectable to one or more said connecting circuit inputs through one or more valves, and wherein the hydraulic connecting circuit further comprises a manifold diverting valve which is controllable (typically by the controller) to connect the switching manifold portion to the first manifold portion or the third manifold portion. The method may comprise switching a said manifold diverting valve to switch the switching manifold portion from being connected to the first manifold portion to being connected to the third manifold portion, or vice versa. Thus, some pump modules may be connected to either the first or second manifold portions through valves and one or more pump modules may be connected to either first or third manifold portion through valves, comprising the diverting valve. Still further, one or more pump modules may be switched from connection to the first connecting circuit output or the third connecting circuit output, or vice versa, at once, by operation of the manifold diverting valve.

It may be that the apparatus is configured (typically that the controller is configured, e.g. programmed) to connect pump modules equally to the first and second hydraulic circuit portions when the total demand of the first and second hydraulic circuit portions exceeds the maximum capacity of the apparatus. The method may comprise connecting pump modules equally to the first and second hydraulic circuit portions (by controlling the switches of the hydraulic connecting circuit) when the total demand of the first and second hydraulic circuit portions exceeds the maximum capacity of the apparatus. It may be that the apparatus is configured (typically that the controller is configured, e.g. programmed) to connect pump modules to the first and second hydraulic circuit portions such as to enable the working chambers to displace fluid to (successfully) meet the demand of a predetermined one of the first and second hydraulic circuit portions but to be unable to completely meet the demand of the other of the first and second hydraulic circuit portions when the total demand of the first and second hydraulic circuit portions exceeds the maximum capacity of the apparatus. The method may comprise connecting pump modules to the first and second hydraulic circuit portions (by controlling the switches of the hydraulic connecting circuit) such as to enable the working chambers to displace fluid to (successfully) meet the demand of a predetermined one of the first and second hydraulic circuit portions but to be unable to completely meet the demand of the other of the first and second hydraulic circuit portions when the total demand of the first and second hydraulic circuit portions exceeds the maximum capacity of the apparatus.

It may be that the controller is configured (e.g. programmed) to control the valves of the hydraulic connecting circuit to change which hydraulic circuit portion one or more pump modules are connected to depending on the first and second demands and/or depending on predictions of future values of the first and second demand.

The function of the controller may be distributed between two or more separate circuits and/or hardware processors.

The method may comprise operating the valves of the hydraulic connecting circuit to connect pump modules equally to the first and second hydraulic circuit portions when the total demand of the first and second hydraulic circuit portions exceeds the maximum capacity of the apparatus. The method may comprise operating the valves of the hydraulic connecting circuit to connect pump modules to the first and second hydraulic circuit portions such as to enable the working chambers to displace fluid to (successfully) meet the demand of a predetermined one of the first and second hydraulic circuit portions but to be unable to completely meet the demand of the other of the first and second hydraulic circuit portions when the total demand of the first and second hydraulic circuit portions exceeds the maximum capacity of the apparatus.

The method may comprise operating the valves of the hydraulic connecting circuit to control the valves to change which hydraulic circuit portion one or more pump modules are connected to depending on the first and second demands and/or depending on predictions of future values of the first and second demand.

The demands are typically represented by demand signals calculated taking into account measurements from the respective sensor. They may be calculated further taking into account measurements from a plurality of sensors and/or manually operable controls.

The high and low pressures of the manifolds we refer to are relative pressures. The low pressure manifolds act as or communicates with a store of hydraulic fluid for supply to the working chambers to pump and thereby pressurise. The high pressure manifolds act as conduits for hydraulic fluid which has been pressurised by the action of the working chambers.

Some of the features described above are relevant to other categories of hydraulic apparatus in which the connection between pump modules and actuators may be changed and in a third aspect the invention relates more generally to an apparatus comprising:

a plurality of hydraulic actuators, a prime mover, a hydraulic machine having a rotatable shaft in driven engagement with the prime mover and comprising at least three working chambers having a volume which varies cyclically with rotation of the rotatable shaft, each working chamber of the hydraulic machine comprising a low-pressure valve which regulates the flow of hydraulic fluid between the working chamber and a low-pressure manifold and a high-pressure valve which regulates the flow of hydraulic fluid between the working chamber and a high-pressure manifold, wherein the working chambers are formed into a plurality of pump modules each of which has a respective high-pressure manifold which is common to that pump module, a hydraulic connecting circuit comprising a plurality of inputs, each of which is in fluid communication with the high-pressure manifold of a respective pump module, a plurality of connecting circuit outputs, each of which is in fluid communication with a different one or more of the hydraulic actuators, the hydraulic connecting circuit configured to connect each said connecting circuit input to a said connecting circuit output and comprising a plurality of valves which are (typically electronically) switchable (typically under the control of the controller) to change the connecting circuit output to which a said connecting circuit input is connected, so that each pump module is connected to one connecting circuit output at a time and thereby to the one or more of the hydraulic actuators which are in fluid communication with the respective connecting circuit output, a controller configured to actively control at least the low pressure valves (and in some embodiments also the high pressure valves) of the said working chambers to determine the net displacement of each working chamber on each cycle of working chamber volume, such that the net displacement of the working chambers of each pump module which are connected to a respective connecting circuit output is controlled to meet a respective demand for hydraulic fluid by the one or more actuators in fluid communication with the respective connecting circuit output.

The apparatus may be configured (typically the controller is configured, e.g. programmed) to control the valves of the hydraulic connecting circuit to change which hydraulic connecting circuit output, and so which one or more actuators, a pump module is connected to depending on the demands and/or depending on predictions of future values of the demands.

The invention extends in a fourth aspect to a method of operating an apparatus, the apparatus comprising:

a plurality of hydraulic actuators, a prime mover, a hydraulic machine having a rotatable shaft in driven engagement with the prime mover and comprising at least three working chambers having a volume which varies cyclically with rotation of the rotatable shaft, each working chamber of the hydraulic machine comprising a low-pressure valve which regulates the flow of hydraulic fluid between the working chamber and a low-pressure manifold and a high-pressure valve which regulates the flow of hydraulic fluid between the working chamber and a high-pressure manifold, wherein the working chambers are formed into a plurality of pump modules each of which has a respective high-pressure manifold which is common to that pump module, a hydraulic connecting circuit comprising a plurality of inputs, each of which is in fluid communication with the high-pressure manifold of a respective pump module, a plurality of connecting circuit outputs, each of which is in fluid communication with a different one or more of the hydraulic actuators, the hydraulic connecting circuit configured to connect each said connecting circuit input to a connecting circuit output and comprising a plurality of valves which are (typically electronically) switchable to change the connecting circuit output to which a said connecting circuit input is connected, so that each pump module is connected to one connecting circuit output at a time and thereby to the one or more of the hydraulic actuators which are in fluid communication with the respective connecting circuit output, the method comprising actively controlling at least the low pressure valves (and in some embodiments also the high pressure valves) of the said working chambers to determine the net displacement of each working chamber on each cycle of working chamber volume, such that the net displacement of the working chambers of each pump module which are connected to a respective actuator is controlled to meet a respective demand for hydraulic fluid by the one or more actuators in fluid communication with the respective connecting circuit output, and changing the connecting circuit output and thereby the one or more hydraulic actuators to which a pump module is connected by switching one or more valves of the hydraulic connecting circuit.

Thus the net displacement of the working chambers of a pump module which is switched to being connected to a respective connecting circuit output are controlled to meet the demand for hydraulic fluid by the one or more actuators in fluid communication with the respective connecting circuit output. Thus the net displacement of the working chambers of a pump module which is switched to no longer be connected to a respective connecting circuit output are no longer controlled to meet the demand for hydraulic fluid by the one or more actuators in fluid communication with the respective connecting circuit output. If more than one pump module is connected to a respective connecting circuit output, the net displacement of the working chambers of each pump module connected to the respective connecting circuit output are controlled in combination to meet the demand for hydraulic fluid by the one or more actuators in fluid communication with the connecting circuit output. By the actuators being in fluid communication with the connecting circuit output we mean hydraulically connected to the connecting circuit output than through the hydraulic connecting circuit.

Typically, each pump module may be connected to only one connecting circuit output at a time (for example, exclusively). It may be that each connecting circuit output is connected to one actuator (for example, exclusively). This allows precise control of the fluid displaced to each actuator. However, it may be that each connecting circuit output is connected to a group of one or more actuators. Typically, each actuator is connected to one connecting circuit output (for example, exclusively). A plurality of pump modules may be connected to the same connecting circuit output (e.g. to together drive the one or more actuators in fluid communication with the connecting circuit output).

The working chambers which make up each pump module need not be adjacent. Typically each pump module has a high-pressure manifold which is the high-pressure manifold to which each working chamber in the group is connected (through a high pressure valve). Thus, the pump modules may make a displacement of working fluid through their respective high-pressure manifold, into the connecting circuit input and thus to a connecting circuit output (depending on the setting of the valves in hydraulic connecting circuit) and thereby to a connecting circuit output (and to the one or more actuators in fluid communication with that output), which displacement is independent of each other pump module.

Typically, the high-pressure manifolds of the pump modules are separate to each other, at least during normal operation. (The low-pressure manifolds may be common to all working chambers with no effect on operation). Typically, the working chambers of the pump modules connected to the different connecting circuit outputs are controlled based on separate demand signals. The working chambers connected to different circuit outputs may therefore be controlled to have independent output pressures and flow rates and pump modules may be swapped from being connected to one connecting circuit output to being connected to a different connecting circuit output.

The demands for hydraulic fluid are signals indicative of a demand for hydraulic fluid by the one or more actuators in fluid communication with a connecting circuit output. The demands may for example be demands for pressure or flow rate of hydraulic fluid, or a position of the actuator (a demand for fluid flow to be controlled to achieve a particular actuator position). It may be that the actuators or the fluid connections between the connecting circuit outputs comprise sensors, for example pressure or flow sensors or, in the case of actuators, position, speed or acceleration sensors. It may be that the demands are calculated from the output of these sensors. It may be that the demands are calculated from user operable controls, for example, an electrical signal (analogue or digital) or hydraulic pressure from a user interface (e.g. touch screen controller) or manually operated control, such as a joystick or handle. The demands may be calculated from proportional valve control signals (which in respect of the invention can optionally be used to control a proportional valve comprised within a respective hydraulic circuit portion (this is the conventional method of control), or not). The demands may be calculated from signals received (whether from a user or from an electronic controller) through an electric communications network such as a CAN (controller area network). The demands are independent of each other, to enable the actuators connected to different connecting circuit outputs, to be independently controlled.

Accordingly, the pressure of hydraulic fluid at different connecting circuit outputs (and thereby received by different groups of one or more actuators) can be independently varied. Typically, the rate of flow of hydraulic fluid through the different connecting circuit outputs may be independently varied. Furthermore, as changes may be implemented for each cycle of working chamber volume, the pressures and flow rates may be rapidly varied for individual groups of one or more actuators (connected to different connecting circuit outputs). However, the individual pump modules can be reallocated between connecting circuit outputs (and therefore actuators), enabling a greater or lesser number of them to be used together where required (for a particular one or more actuators).

The net displacement of the working chambers of a pump module which is switched to being connected to a connecting circuit output are controlled to meet the demand for hydraulic fluid by the one or more actuators in fluid communication with the connecting circuit output. The net displacement of the working chambers of a pump module which is switched to no longer be connected to a connecting circuit output are no longer controlled to meet the demand for hydraulic fluid by the one or more actuators in fluid communication with the connecting circuit output. The net displacement of the working chambers of each pump module which are connected to a respective connecting circuit output are controlled in combination to meet the demand for hydraulic fluid by the one or more actuators in hydraulic communication with the connecting circuit output.

It may be that the said valves are diverting valves which are electronically controllable to connect the high-pressure port of a pump module exclusively to either a first connecting circuit output or a second connecting circuit output. However, it may be that the hydraulic connecting circuit comprises a plurality (e.g. a matrix) of valves allowing each connecting circuit input, and so each pump module, to be connected to any one of a plurality of (or in some embodiments each) connecting circuit output. The method may comprise operating one or more said valves to switch a pump module from being connected to a first connecting circuit output to be connected to a second connecting circuit output.

It may be that the plurality of switches comprises two switches which connect a connecting circuit input to a connecting circuit output in parallel. The method may comprise operating (and the controller may be configured to operate) the two switches so that only one or the other is open at a given time. The method may comprise ensuring (and the controller may be configured to ensure) that each connecting circuit input (and so each pump module) is connected to at least one connecting circuit output at all times.

It may be that the high pressure manifold of some or all pump modules are connected to a first connecting circuit output through a first valve and to a second connecting circuit output through a second valve. It may be that the controller staggers switching of the first and second valves, to avoid both being closed at the same time. The method may comprise staggering the switching of the first and second valves. It may be that one of the first and second valves is a normally open valve and the other is a normally closed valve. These features reduce the risk of hydraulic deadhead. It may be that the controller takes into account that the normally open valve will open more quickly than it will close, and vice versa for the normally closed valve, when controlling the timing of switching the first and second valves and/or causing one or more working chambers to carry out inactive cycles while causing a pump module to be disconnected from a first connecting circuit output (and so a first actuator or group of one or more actuators) and connected to a second connecting circuit output (and so to a second actuator of group of one or more actuators).

As with the first and second aspects, the one or more working chambers within each respective pump module are connected together. Each pump module may be a pump module which has a common output of hydraulic fluid to (a connecting circuit input of) the hydraulic connecting circuit. The method comprises regulating the net displacement of working fluid by each pump module. Typically, the controller is operable to regulate the net displacement of working fluid by each pump module. Typically, the hydraulic machine comprises a plurality of pump modules, each pump module comprising a respective group of one or more working chambers which have a common high pressure manifold through which they are connected to the hydraulic connecting circuit.

It may be that the controller controls at least the low pressure valves of the working chambers to determine whether each working chamber undergoes either an active cycle, with a net displacement of working fluid between the low-pressure manifold and the high-pressure manifold of the working chamber, or an inactive cycle, with no net displacement of working fluid between the low-pressure manifold and the high-pressure manifold of the working chamber, for each cycle of working chamber volume. The method may comprise controlling at least the low pressure valves of the working chambers to determine whether each working chamber undergoes either an active cycle, with a net displacement of working fluid between the low-pressure manifold and the high-pressure manifold of the working chamber, or an inactive cycle, with no net displacement of working fluid between the low-pressure manifold and the high-pressure manifold of the working chamber, for each cycle of working chamber volume. It may be that in at least some circumstances (for example when a demand remains within at least one range of values) the working chamber intersperses active and inactive cycles (typically the controller causes a working chamber to intersperse active and inactive cycles).

It may be that during operation the hydraulic connecting circuit connects one or more pump modules directly to the one or more hydraulic actuators which are in fluid communication with a hydraulic circuit output, typically without an intervening proportional flow valve. It may be that at least one (and in some embodiments each) connecting circuit output is connected to a single actuator. The controller may be operable to select the net displacement of working chambers which are connected to the said hydraulic circuit output (and so single actuator) in response to a demand signal related to a target position, rate of movement or force of the said actuator. The method may comprise selecting the net displacement of working chambers which are connected to the said hydraulic actuator responsive to a demand signal related to a target position, rate of movement or force of the said hydraulic actuator. Thus, the hydraulic actuator might be directly controlled by variation in the displacement of one or more pump modules.

It may be that the apparatus is configured (e.g. the controller is programmed) such that when a pump module is switched from being connected to one connecting circuit output (and so to one or more actuators in communication with the connecting circuit output), the working chambers of the respective pump module are caused to carry out inactive cycles while the valves are switched. It may be that while hydraulic connecting circuit valves associated with a pump module are being switched, the working chambers are not caused to start any active cycles (e.g. by closure of their low pressure valves). Typically in at least some circumstances they would otherwise have carried out active cycles.

It may be that the apparatus is configured (e.g. the controller is programmed) such that when a pump module is switched from being connected to one connecting circuit output to being connected to another connecting circuit output, the working chambers of the respective pump module are caused to carry out additional active cycles in order to increase the pressure in the high pressure manifold of the pump module before the valves are switched. It may be that in advance of a pump module being switched from being connected to one actuator to being connected to another actuator, the working chambers of the respective pump module are caused to carry out additional active cycles in order to increase the pressure in the high pressure manifold of the pump module before the valves are switched It may be that the apparatus is configured (e.g. the controller is programmed) such that when a pump module is switched from being connected to one hydraulic circuit portion to another hydraulic circuit portion (when a connecting circuit input is switched from one to another connecting circuit output), the working chambers of the respective pump module are caused to carry out (only) inactive cycles while the valves (of the hydraulic connecting circuit) (are switched. The method may comprise the step of causing the working chambers of a pump module to carry out (only) inactive cycles while the valves of the hydraulic connecting circuit are switched to connect the pump module to a different hydraulic circuit portion. It may be that while connecting circuit valves associated with a pump module are being switched, the working chambers are not caused to start any active cycles (e.g. by closure of their low pressure valves). The method may comprise the step of causing the working chambers of a pump module to not start any active cycles while the valves of the hydraulic connecting circuit are switched to connect the pump module to a different hydraulic circuit portion. Typically in at least some circumstances they would otherwise have carried out active cycles.

It may be that the apparatus is configured (e.g. the controller is programmed) such that when the hydraulic circuit portion to which a pump module is connected is changed, the working chambers of the respective pump module are caused to carry out additional active cycles in order to increase the pressure in the high pressure manifold of the pump module before the connecting circuit valves are switched. The method may comprise causing the working chambers of a pump module to carry out additional active cycles in order to increase the pressure in the high pressure manifold of the pump module before the valves of the hydraulic connecting circuit are switched to connect the pump module to a different hydraulic circuit portion.

It may be that the high pressure manifold of some or all pump modules are connected to the first hydraulic circuit portion through a first valve (of the hydraulic connecting circuit) and to the second hydraulic circuit portion through a second valve (of the hydraulic connecting circuit). It may be that the controller staggers switching of the first and second valves, to avoid both being closed at the same time. The method may comprise staggering the switching of the first and second valves, to avoid both being closed at the same time. It may be that one of the first and second valves is a normally open valve and the other is a normally closed valve. These features reduce the risk of hydraulic deadhead. It may be taken into account that the normally open valve will open more quickly than it will close, and vice versa for the normally closed valve, when controlling the timing of switching the first and second valves and/or causing one or more working chambers to carry out inactive cycles while changing the hydraulic circuit portion to which a pump module is connected.

It may be that the controller is configured (e.g. programmed) to control the valves (of the hydraulic connecting circuit) to change which connecting circuit output one or more pump modules are connected to depending on the demands and/or depending on predictions of future values of the demands. The method may comprise controlling the valves (of the hydraulic connecting circuit) to change which connecting circuit output one or more pump modules are connected to depending on the demands and/or depending on predictions of future values of the demands.

The function of the controller may be distributed between two or more separate circuits and/or hardware processors.

The hydraulic connecting circuit may comprise a directional control valve for each actuator (i.e. a valve which controls the direction of movement of an actuator, e.g. diverting fluid to one or the other side of a double-sided piston cylinder).

In the apparatus of the first and third aspects of the invention, and in the method of the second and fourth aspects of the invention, problems may arise when the total demand for working fluid for two or more hydraulic circuit portions (the sum of the first demand and the independent second demand plus in some embodiments one or more further demands for hydraulic fluid of further hydraulic circuit portions) is a high fraction of, or exceeds, the maximum net displacement of the working chambers of the pump modules which can be concurrently connected to the two or more hydraulic circuit portions by the hydraulic connecting circuit. When this occurs, there can be circumstances where all of the demands for hydraulic fluid cannot be met concurrently and the net displacement of the working chambers of the pump modules connected to a first one of the two or more hydraulic circuit portions is not fully met, however, when later due to a change in one or more of the demands, one or more pump modules is switched to be connected to the first one of the two or more hydraulic circuit portions, the net displacement to the first one of the two or more hydraulic circuit portions suddenly increases, due to the additional capacity, which can lead to judder and difficulties with the control of the apparatus.

Thus, it may be that the demand signals are regulated to avoid a sudden increase, (e.g. an increase exceeding a threshold), in the displacement of working fluid to a hydraulic circuit portion (in the case of the first or second aspect of the invention), and/or a connecting circuit output (in the case of the third or fourth aspect of the invention) responsive to changing the hydraulic circuit portion and/or connecting circuit output to which a pump module is connected. Typically, the demand signal relating to the hydraulic circuit portion and/or connecting circuit output to which the pump module is connected to is the demand signal which is regulated.

The demands may for example be proportional to a demanded flow rate of hydraulic fluid (to a respective hydraulic circuit portion in the case of the first or second aspects, or to the one or more actuators connected to a respective connecting circuit output in the case of the third or fourth aspect), per unit time or per cycle of working chamber volume or per rotation of a rotatable shaft. They may be analogue or digital signals.

It may be that when a plurality of demands for hydraulic fluid, relating to respective hydraulic circuit portions (in the case of the first or second aspect) or the one or more actuators in fluid communication with respective connecting circuit outputs (in the case of the third or fourth aspect), are such that the plurality of demands cannot be met concurrently, irrespective of which pump modules are connected to which hydraulic circuit portions or connecting circuit outputs, some or all of the plurality of demands are reduced (typically proportionally) by multiplication by a scaling factor.

The scaling factor may be (e.g. calculated) so that they (the plurality of demands) are in total at most the maximum rate of displacement which is possible concurrently by all but one of the pump modules which can be connected to an individual hydraulic circuit or connecting circuit output. Typically the scaling factor is, or is at most, the ratio of (a) the maximum rate of displacement which is possible concurrently by all but one of the pump modules which can be connected to an individual hydraulic circuit or connecting circuit output, to (b) the sum of the plurality of demands (for hydraulic fluid relating to each of the individual hydraulic circuits or connecting circuit outputs, as appropriate).

This will typically apply when the sum of the plurality of demands exceeds (a) the maximum rate of displacement which is possible concurrently by all but one of the pump modules which can be connected to an individual hydraulic circuit or connecting circuit output (and not just when it exceeds (c) the maximum rate of displacement which is possible concurrently by all of the pump modules which can be connected to the individual hydraulic circuit or connecting circuit output).

It may be that the pump modules all have the same capacity and can all be connected to the same hydraulics or connecting circuit outputs. In this case, the ratio (a)/(c) is the ratio of (the number of pump modules minus one) to (the number of pump modules).

In some embodiments the demands consist of a first demand for hydraulic fluid for a first hydraulic circuit portion, or the one or more actuators in fluid communication with a first connecting circuit output, and a second demand for hydraulic fluid for a second hydraulic circuit portion, or the one or more actuators in fluid communication with a second connecting circuit output.

In this case, it may be that at least when the sum of the first and second demand exceeds the maximum displacement of the pump modules which may be connected to the first or second hydraulic circuit portion, or one or more actuators in fluid communication with a first connecting circuit output, the first and/or second demands are reduced by multiplication by a scaling factor which is at most the ratio of (a) the maximum rate of displacement which is possible concurrently by all but one of the pump modules which can be connected to the first or second hydraulic circuit or connecting circuit output, to (b) the sum of first and second demands.

This may apply when the sum of the plurality of demands exceeds (a) the maximum rate of displacement which is possible concurrently by all but one of the pump modules which can be connected to the first or second individual hydraulic circuit or connecting circuit output.

The use of these scaling ratios has the effect that connecting a further pump module to a hydraulic circuit portion or connecting circuit output (as appropriate) does not lead to a sudden jump in output displacement to the hydraulic circuit portion or connecting circuit output. It may be that when a scaled demand reaches the maximum output of the pump modules which are currently connected to a hydraulic circuit portion or connecting circuit output an additional pump module is connected to the hydraulic circuit portion or connecting circuit output (as appropriate). Thus, it may be that the demands are reduced by multiplication by a scaling factor so that the reduced demands never exceed the maximum output of the pump modules which are currently connected to a hydraulic circuit portion or connecting circuit output (as appropriate).

More generally, there may be n hydraulic circuit portions (in the case of the first or second aspects of the invention) each having an associated demand, thus a total of n demands. There may be n connecting circuit outputs (in the case of the third or further aspects of the invention) each having an associated demand, thus a total of n demands. In some embodiments n=2. It may however be that n is greater than 2.

It may be that there are n demands for hydraulic fluid for respective hydraulic circuit portions (in case of the first or second aspect of the invention) or actuators connected to respective connecting circuit outputs (in case of the third or fourth aspects of the invention), and when the n demands are such that irrespective of which pump modules are connected to which connecting circuit outputs, the n demands cannot all be met concurrently, then if one of the n demands are for more than (100/n) % of the maximum displacement of the pump modules which can be connected to the respective hydraulic circuit portion or connecting circuit output, then the respective hydraulic circuit portion or connecting circuit output has pump modules capable of delivering at least (100/n) % of the maximum displacement connected thereto.

It may be that if a first demand of the n demands is for more than (100/n) % of the said maximum displacement but another second demand of the n demands is for less than (100/n) % of the said maximum displacement such that the second demand can be met using fewer pump modules than are required to deliver (100/n) % of the said maximum displacement then one or more pump modules which are not required to meet the second demand are connected to the hydraulic circuit portion or connecting circuit output associated with the first demand instead of that associated with the second demand such that the hydraulic circuit portion or connecting circuit output associated with the first demand has connected thereto pump modules capable of delivering greater than (100/n) % of the maximum displacement (and the displacement delivered to the hydraulic circuit portion or connecting circuit output associated with the first demand is greater than (100/n) % of the maximum displacement).

It may be that if one of the demands is for below (100/n) % of the maximum displacement of the pump modules but above a threshold, each hydraulic circuit portion or connecting circuit portion has pump modules capable of delivering (100/n) % of the maximum displacement connected thereto, optionally wherein if one of the demands is below the threshold, the demands are scaled down such that they sum to at most the maximum rate of displacement which is possible by all but one pump module which can be connected to any of the hydraulic circuit portions or connecting circuit outputs.

Optionally n=2. Thus, there may be first and second demands (for hydraulic fluid to first and second hydraulic circuit portions or the one or more actuator connected to first and second connecting circuit portions), and when the first and second demands are such that irrespective of which pump modules are connected to the first hydraulic circuit portion or connecting circuit portion and which pump modules are connected to the second hydraulic circuit portion or connecting circuit portion, the first and second demands cannot be met concurrently, then the respective hydraulic circuit portion of connecting circuit output has pump modules capable of delivering 50% of the maximum displacement connected thereto. Furthermore, it may be that if one of the demands is for below 50% of the maximum displacement of the pump modules but above a threshold, each hydraulic circuit portion or connecting circuit portion has pump modules capable of delivering 50% of the maximum displacement connected thereto, optionally wherein if one of the demands is below the threshold, the demands are scaled down such that they sum to at most the maximum rate of displacement which is possible by all but one pump module which can be connected to the first or second hydraulic circuit portions or connecting circuit outputs.

It may be that the method comprises connecting, or the controller is configured to control the hydraulic connecting circuit such as to connect pump modules to hydraulic circuit portions (in the case of the first or second aspect) or connecting circuit outputs, so that the number or capacity of pump modules connected to each hydraulic circuit portion or connecting circuit output is proportional to the demands for hydraulic fluid for the said hydraulic circuit portions (in the case of the first or second aspect) or the one or more actuators connected to the connecting circuit outputs (in the case of the third of fourth aspect), typically with rounding to the nearest integer Other methods of regulating the demand signals to avoid a sudden increase in displacement can be considered, such as applying a maximum slew rate to each demand signal.

Features described above are optional features of each of the four aspects of the invention.

DESCRIPTION OF THE DRAWINGS

An example embodiment of the present invention will now be illustrated with reference to the following Figures in which.

DETAILED DESCRIPTION OF AN EXAMPLE EMBODIMENT

Figure 1:
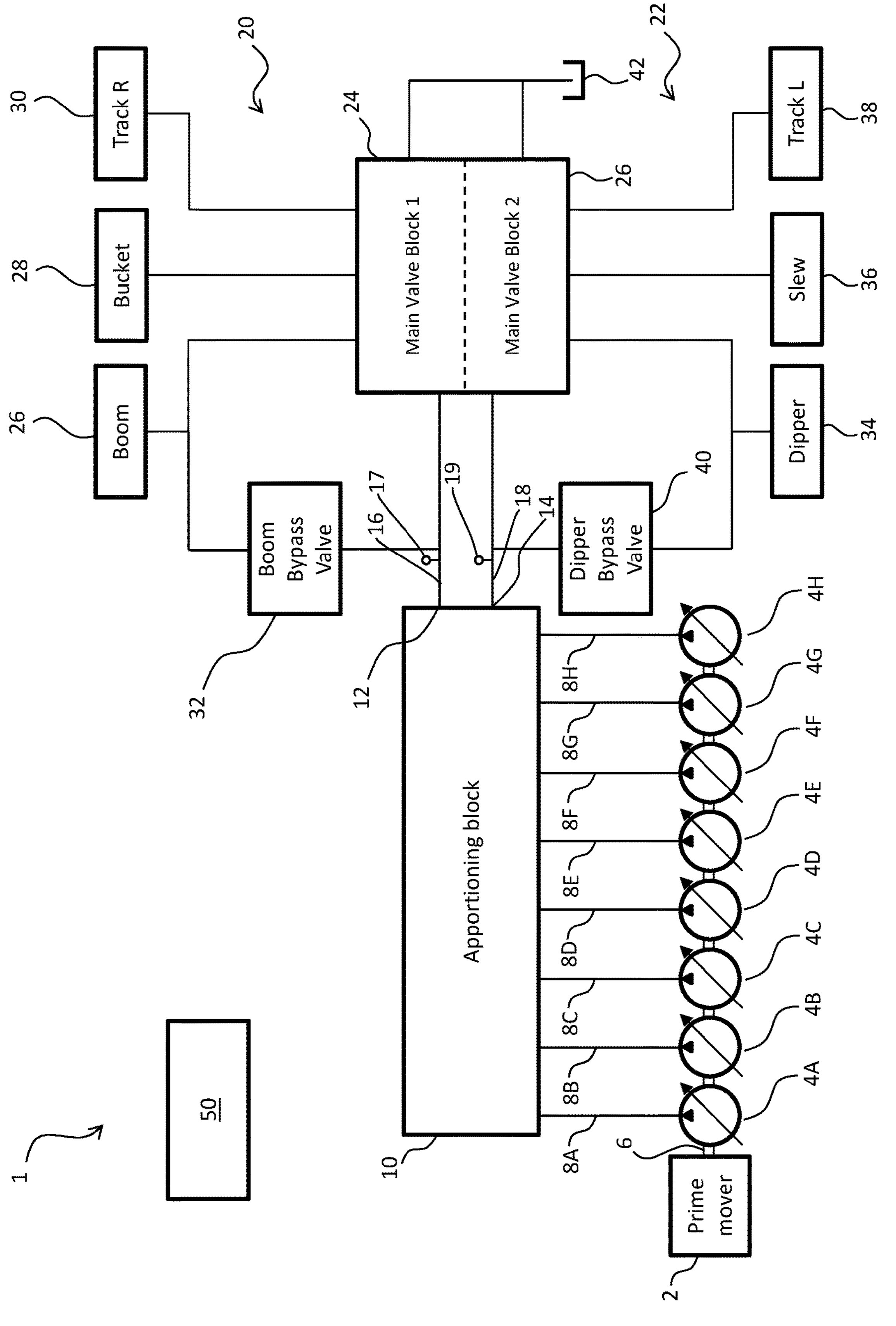
FIG. 1 is a schematic diagram of a hydraulic apparatus according to the invention.

With reference to FIG. 1, an excavator 1 (being an example of a hydraulic apparatus) comprises an engine 2, which drives a plurality of pump modules 4A, 4B, 4C, 4D, 4E, 4F, 4G, 4H, (being a plurality of pump modules) each of which comprises a number of working chambers in the form of piston cylinder units, PCUs, which are driven by the prime mover through a common rotating shaft 6. The working chambers within a given pump module are connected so as to provide a common output of hydraulic fluid through a respective high pressure manifold 8A, 8B, 8C, 8D, 8E, 8F, 8G, 8H to an apportioning block 10 which has inputs (the connecting circuit inputs) to receive fluid from each high pressure manifold, and outputs 12, 14 (connecting circuit outputs) which connect with or function as inlets 16, 18 (hydraulic circuit portion inlets) to first and second hydraulic circuit portions 20, 22. Pressure sensors 17, 19, measure the pressure at the inlets to the first and second hydraulic circuit portions. The first hydraulic circuit portion has a first valve block 24 and a first plurality of actuators (6, 28, 30), in this example a boom 26, a bucket 28 and a right track 30. A boom bypass valve 32 is configured to provide a selectable alternative path for hydraulic fluid from the inlet to the first hydraulic circuit portion to flow directly to the boom rather than through the first valve block. The second hydraulic circuit portion has a second valve block 26 and a second plurality of actuators (34, 36, 38), in this example a dipper 34, a slew function 36, and a left track 38. A dipper bypass valve 40 is configured to provide a selectable path for hydraulic fluid from the inlet to the second hydraulic circuit portion to flow directly to the dipper rather than through the second valve block. The first and second hydraulic circuit portions output fluid back to tank 42. A controller 50 controls valves which regulate the flow of fluid within each working chamber and valves within the apportioning block as will be described.

Figure 2:
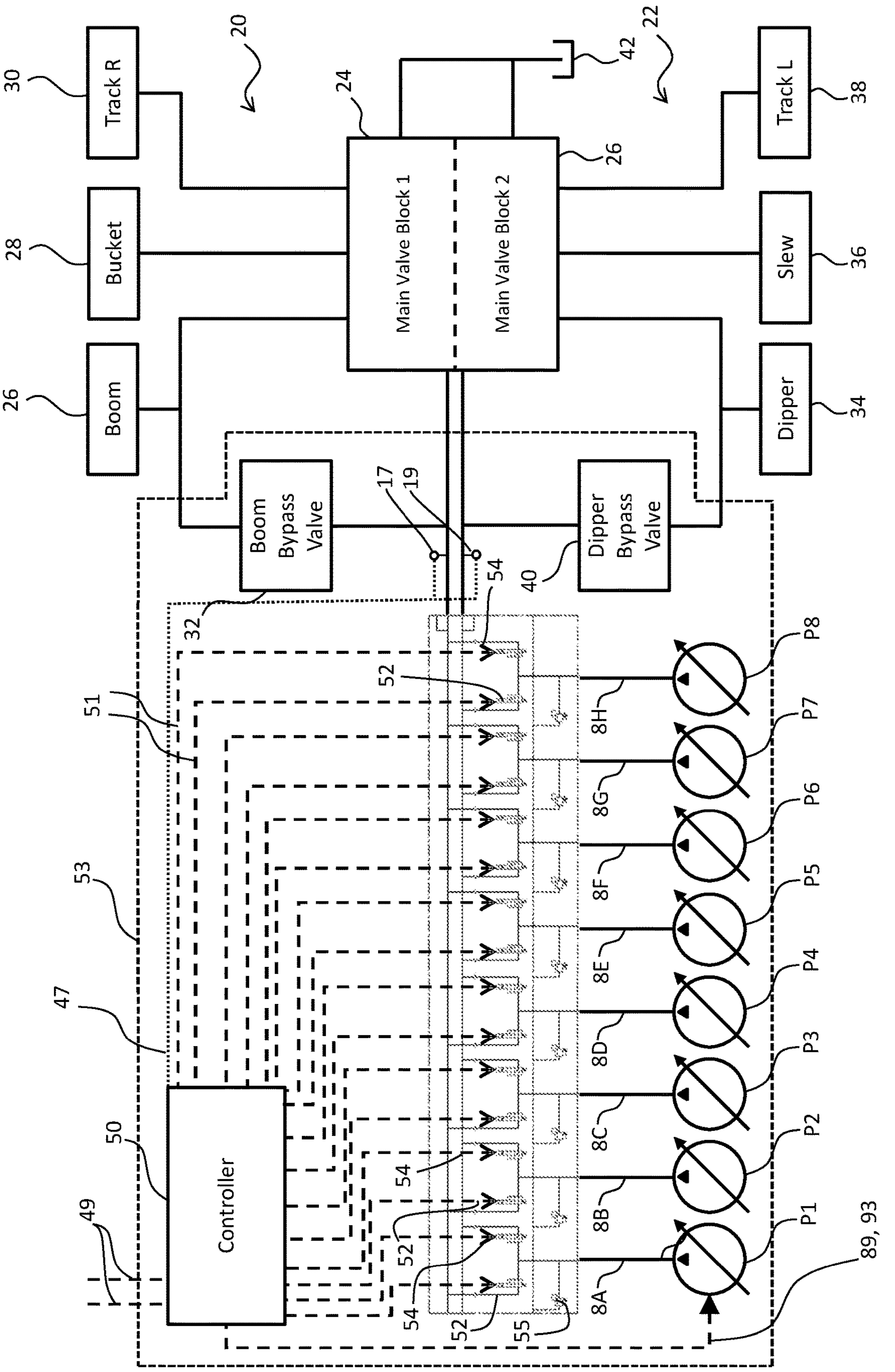
FIG. 2 corresponds to FIG. 1 with some additional detail.

Features in FIG. 2 correspond to the features of FIG. 1, and FIG. 2 shows that within the apportioning block, for each pump module, there are first and second diverting valves 52, 54, which are controllable to connect the high pressure manifold (output, when pumping) of the pump module to either first or second apportioning manifold 56, 58 which extend through the apportioning block to respective outputs 12, 14 and inputs 16, 18 of the first and second valve blocks (the connecting circuit outputs). Furthermore pressure relief valves 55 connect each high pressure manifold to tank. The controller receives demand signal from sensor through inputs 49, receives pressure (and other feedback signals) through inputs 47, and transmits signals to the working chamber valves through signal lines 89, 93 and to the switchable valves of the apportioning block through control lines 51. Features which are custom to the present invention are shown within the dashed box 53 and the remaining features are known from existing hydraulic apparatuses such as excavators.

Figure 8:
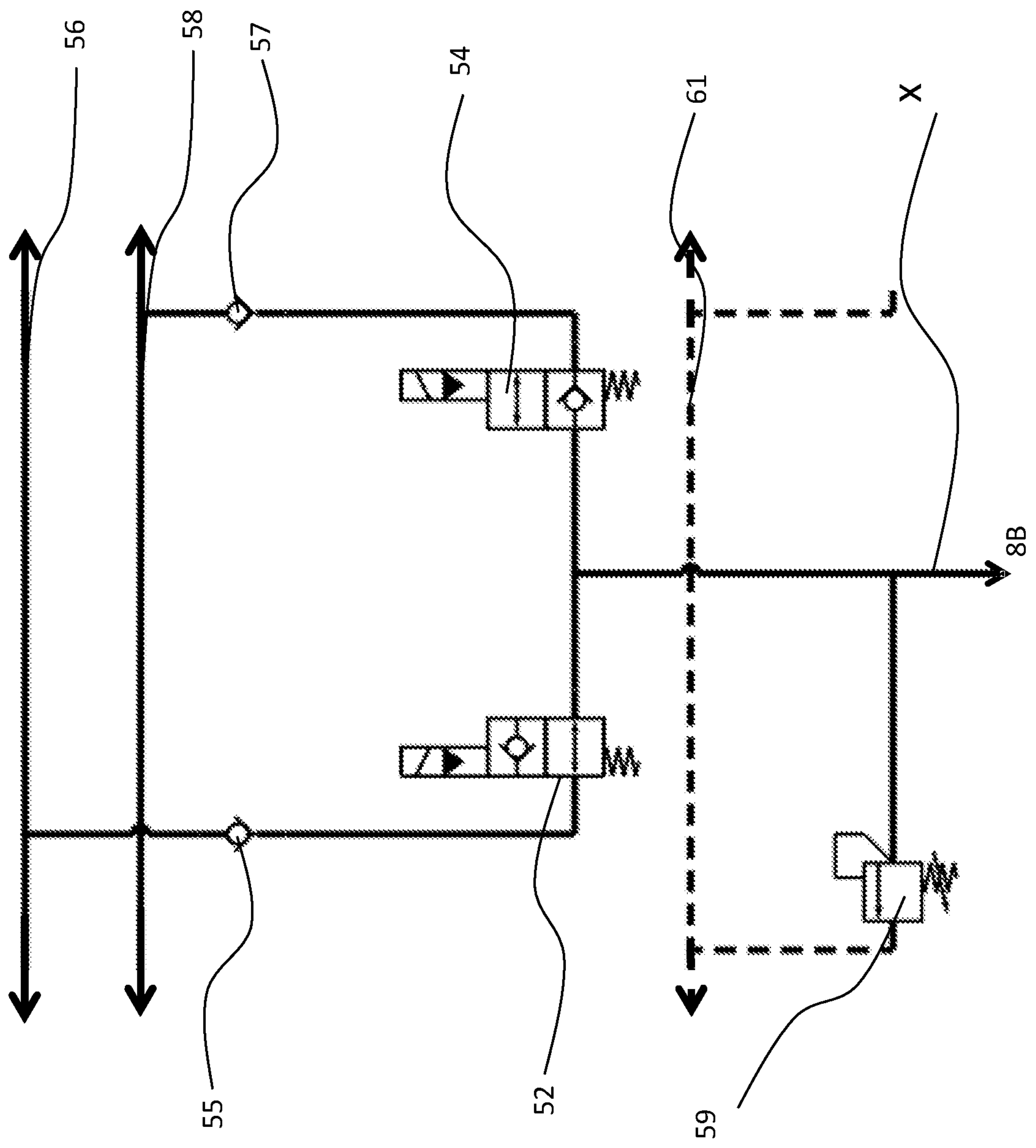
FIG. 8 is a schematic diagram of an integer portion of the apportioning block showing the diverting valve arrangement.

More detail is shown in FIG. 8 for a single integer portion of the apportioning block. In this example, the first and second diverting valve for each pump module are poppet valves which are controlled in tandem such that one is open and the other is closed, with both being switched between open and closed or vice versa at the same time (or with a short delay, to ensure that one is open at all times, to reduce the risk of hydraulic deadhead). Thus, they function as diverting valves. In some embodiments the first and second valves are formed with a single valve member which moves together under the control of a single valve control signal. In other embodiments, they are separate but controlled in tandem. For each pair of first and second valves, one is typically a normally open valve and the other typically a normally closed valve, which also reduces the risk of hydraulic deadheading, especially if the control signal is lost. This is shown in FIG. 8 where valve 52 is normally open and valve 54 is normally closed. However, they may be both normally open or normally closed.

Check valves 55, 57 are provided which open away from the switchable valve to block flow from the hydraulic circuit portion to which it is connected back into the high pressure manifold. This maintains isolation of the high pressure manifolds from each other and avoids fluid from a higher pressure manifold draining to a lower pressure manifold. In embodiments in which one or more pump modules may also function as a motor to receive hydraulic fluid back from the actuators of a hydraulic circuit portion, the check valves could be omitted (at least for the pump modules which may functions as motor). In this case arrangements using the configurations of FIG. 11 or 13 would be useful. It would also be possible to substitute the check valves with a pair of solenoid operated single blocking valves, or pilot operated check valves or to include a selectively openable bypass around the check valves.

A pressure relief valve 59 provides an outlet to a drain line 61 which connects to tank, for use in the event of excess pressure (e.g. during a deadhead event).

The controller is also connected to the pump modules and transmits control signals to regulate the displacement of the pump modules. As we will describe this can be achieved by sending active control signals to electronically controlled valves which regulate the flow of fluid into and out of the working chambers of the pump modules.

Accordingly, the controller can switch which pump modules are connected to which inputs of the hydraulic circuit portions and can regulate the net displacement of each individual pump module as we will describe further below.

The pump modules typically each contain a plurality of working chambers, for example n working chambers which are phased apart by 360°/n, where n is an integer such as 2, 3 or 4. The distributed phasing provides a relatively smooth output of fluid into the respective high pressure manifold. The allocation of working chambers to pump modules is typically fixed but is defined by the connection of the outputs of each working chamber in the pump module to the same high pressure manifold through conduits. Typically each working chamber in the same pump module is fixedly connected to the same shared high pressure manifold. The working chambers which form an individual pump module need not be discrete from the working chambers which form other pump modules, for example, working chambers from different pump modules may be interleaved along the shaft, which may be advantageous, for example to distribute torque along the shaft.

Figure 3:
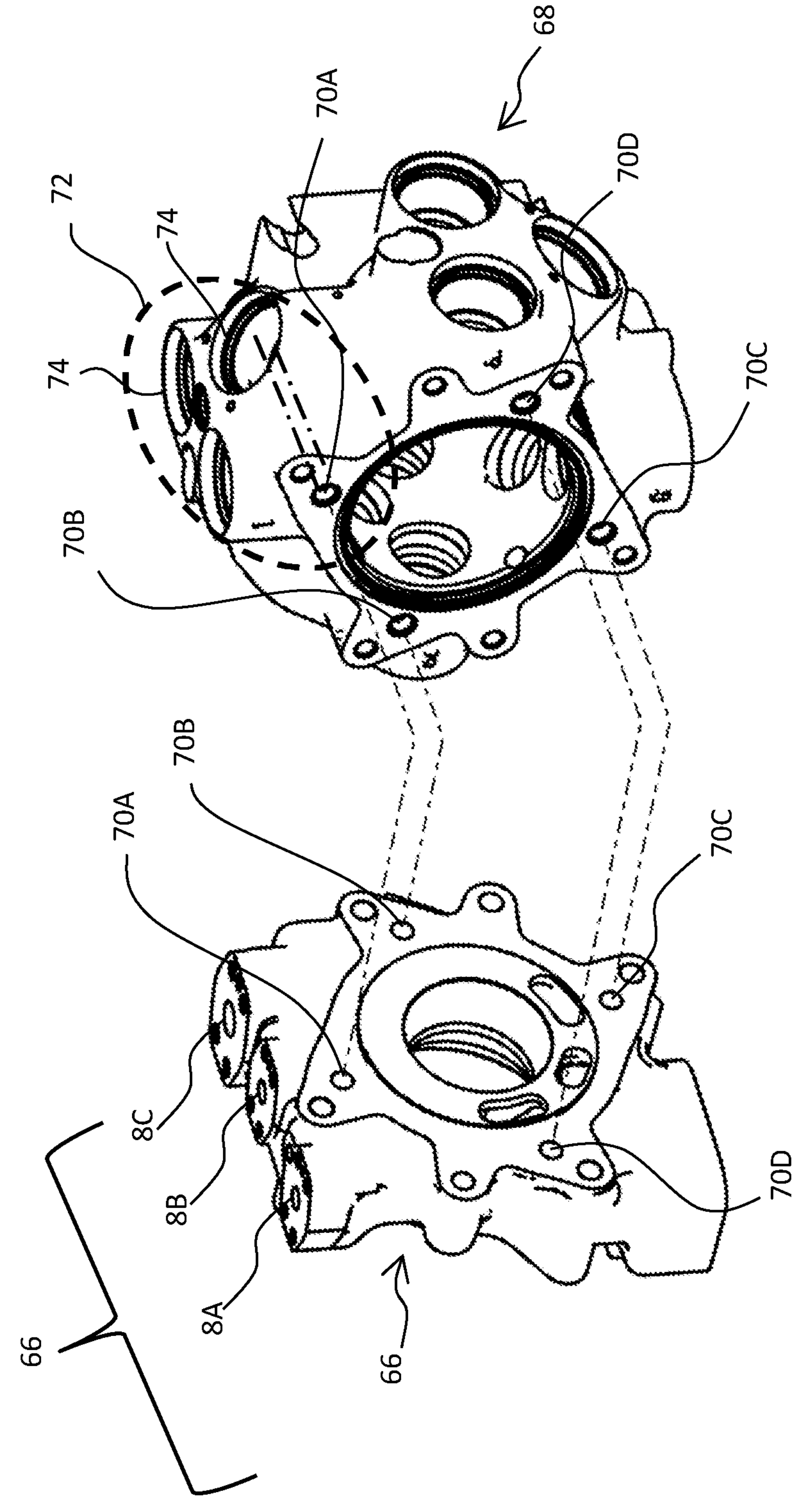
FIG. 3 is a partially exploded view of a pump module and endplate.

The number of working chambers in each pump module need not be the same. One approach to connecting working chambers to form pump modules is shown in FIG. 3 which shows connections being formed in a pump endplate 66 suitable for fitting to a pump housing 68 having a plurality of working chambers. FIG. 3 is a partially exploded view and the dashed lines show the centre lines of manifolds. The manifolds of the pump endplate and the pump housing mate. Conduits having manifolds 70A, 70B, 70C, 70D extend through the pump housing and connect internally to the high pressure outlets of each of a plurality of working chambers. Each working chamber is connected to one conduit. In an example a first pump module is formed in a group 72 of three adjacent bores 74 of the pump housing and these working chambers are connected to conduit 70A. The conduits extend from a group of bores, through the housing, along its axis, and intersect with the face of the machine housing where a port of the conduit mates directly with a matching port on the endplate. Within the endplate, the individual conduit manifolds 70A, 70B, 70C, 70D are connected internally to first, second and third pump module fluid manifolds 76A, 76B, 76C. Each conduit port is connected to one pump module fluid port, but a pump module fluid port may be connected to one or more conduit port. The pump module fluid manifolds are connected to separate input manifolds of the apportioning block and so function as the high pressure manifolds 8A, 8B, 8C of individual pump modules. Thus, pump modules are defined from respective pump modules. In this example, each conduit connects to the output of three working chambers and so each pump module has a multiple of three working chambers.

Figure 4:
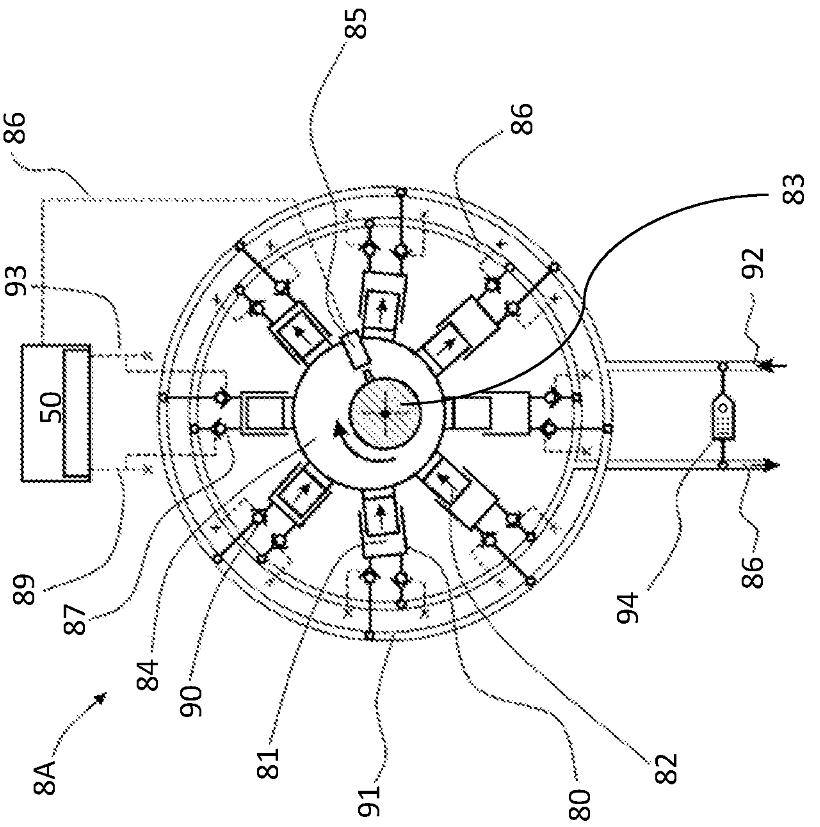
FIG. 4 is a schematic diagram of a pump module.

FIG. 4 is a schematic diagram of a portion of an electronically commutated hydraulic machine (ECM) implementing a pump module 4A. The ECM comprising a plurality of working chambers having cylinders 80 which have working volumes 81 defined by the interior surfaces of the cylinders and pistons 82 which are driven from a rotatable shaft 83 by an eccentric cam 84 and which reciprocate within the cylinders to cyclically vary the working volume of the cylinders. The rotatable shaft is firmly connected to and rotates with a drive shaft. A shaft position and/or speed sensor 85 determines the instantaneous angular position and/or speed of rotation of the shaft, and transmits this to the controller 50 through signal line 86, which enables the machine controller to determine the instantaneous phase of the cycles of each cylinder.

The working chambers are each associated with Low Pressure Valves (LPVs) in the form of electronically actuated face-sealing poppet valves 87, which have an associated working chamber and are operable to selectively seal off a channel extending from the working chamber to a low-pressure hydraulic fluid manifold 88, which may connect one or several working chambers, or indeed all of the working chambers in the pump module as is shown here, to the low-pressure hydraulic fluid manifold of the apparatus and to tank 42. The LPVs are normally open solenoid actuated valves which open passively when the pressure within the working chamber is less than or equal to the pressure within the low-pressure hydraulic fluid manifold, i.e. during an intake stroke, to bring the working chamber into fluid communication with the low-pressure hydraulic fluid manifold but are selectively closable under the active control of the controller via LPV control lines 89 to bring the working chamber out of fluid communication with the low-pressure hydraulic fluid manifold. The valves may alternatively be normally closed valves.

The working chambers are each further associated with a respective High-Pressure Valve (HPV) 90 each in the form of a pressure actuated delivery valve. The HPVs open outwards from their respective working chambers and are each operable to seal off a respective channel extending from the working chamber to a high-pressure hydraulic fluid manifold 91, which may connect one or several working chambers, or indeed all as is shown in FIG. 2, to the high-pressure hydraulic fluid manifold 8A of the pump module. The HPVs function as normally-closed pressure-opening check valves which open passively due to the pressure difference across the valve, and taking into account the force of a biasing member within the HPV). The HPVs also function as normally-closed solenoid actuated check valves which the controller may selectively hold open via HPV control lines 93 once that HPV is opened by pressure within the associated working chamber. Typically, the HPV is not openable by the controller against pressure in the high-pressure hydraulic fluid manifold. The HPV may additionally be openable under the control of the controller when there is pressure in the high-pressure hydraulic fluid manifold but not in the working chamber, or may be partially openable.

In a pumping mode, the controller selects the net rate of displacement of hydraulic fluid from the working chamber to the high-pressure hydraulic fluid manifold by the hydraulic pump by actively closing one or more of the LPVs typically near the point of maximum volume in the associated working chamber's cycle, closing the path to the low-pressure hydraulic fluid manifold and thereby directing hydraulic fluid out through the associated HPV on the subsequent contraction stroke (but does not actively hold open the HPV). The controller selects the number and sequence of LPV closures and HPV openings to produce a flow or create a shaft torque or power to satisfy a selected net rate of displacement. The above 'selection' by the controller is refreshed periodically, or continuously. The selection is refreshed, or updated, when pump modules are allocated to or deallocated from a particular part of the hydraulic circuit portion.

Some embodiments may include pump modules which are also capable of motoring, thereby regenerating energy from hydraulic fluid received back from the hydraulic circuit portions, and converting it into mechanical energy, for example when an actuator is lowered or when a wheel motor is operated as a pump in order to apply braking torque. In these cases, the working chambers of the pump modules are also adapted to motor in which case the controller actively controls the HPV as well as the LPV and can carry out a motoring mode of operation in which the controller selects the net rate of displacement of hydraulic fluid, displaced by the hydraulic machine, via the high-pressure hydraulic fluid manifold, actively closing one or more of the LPVs shortly before the point of minimum volume in the associated working chamber's cycle, closing the path to the low-pressure hydraulic fluid manifold which causes the hydraulic fluid in the working chamber to be compressed by the remainder of the contraction stroke. The associated HPV opens when the pressure across it equalises and a small amount of hydraulic fluid is directed out through the associated HPV, which is held open by the hydraulic machine controller. The controller then actively holds open the associated HPV, typically until near the maximum volume in the associated working chamber's cycle, admitting hydraulic fluid from the high-pressure hydraulic fluid manifold to the working chamber and applying a torque to the rotatable shaft.

As well as determining whether or not to close or hold open the LPVs on a cycle by cycle basis, the controller is operable to vary the precise phasing of the closure of the HPVs with respect to the varying working chamber volume and thereby to select the net rate of displacement of hydraulic fluid from the high-pressure to the low-pressure hydraulic fluid manifold or vice versa.

Arrows on the manifolds 86, 92 indicate hydraulic fluid flow in the motoring mode; in the pumping mode the flow is reversed. A pressure relief valve 94 may protect the hydraulic machine from damage.

In practice there are a number of pump modules such as that shown in FIG. 4, connected by a common shaft and a single controller that can transmit the control signals to the valves associated with each working chamber of each of the pump modules. The working chambers within a pump module need not be evenly spaced around the shaft and are typically interleaved with each other to distribute load along the shaft.

Although the working chambers which make up each pump module are fixed, the pump modules which provide flow to a hydraulic circuit portion can be changed dynamically using the diverting valves. For example, at one time there may be 4 pump modules connected to the first hydraulic circuit portion and 4 pump modules connected to the second hydraulic circuit portion. At another time there may be 6 pump modules connected to the first hydraulic circuit portion and 2 pump modules connected to the second hydraulic circuit portion.

Figure 5:
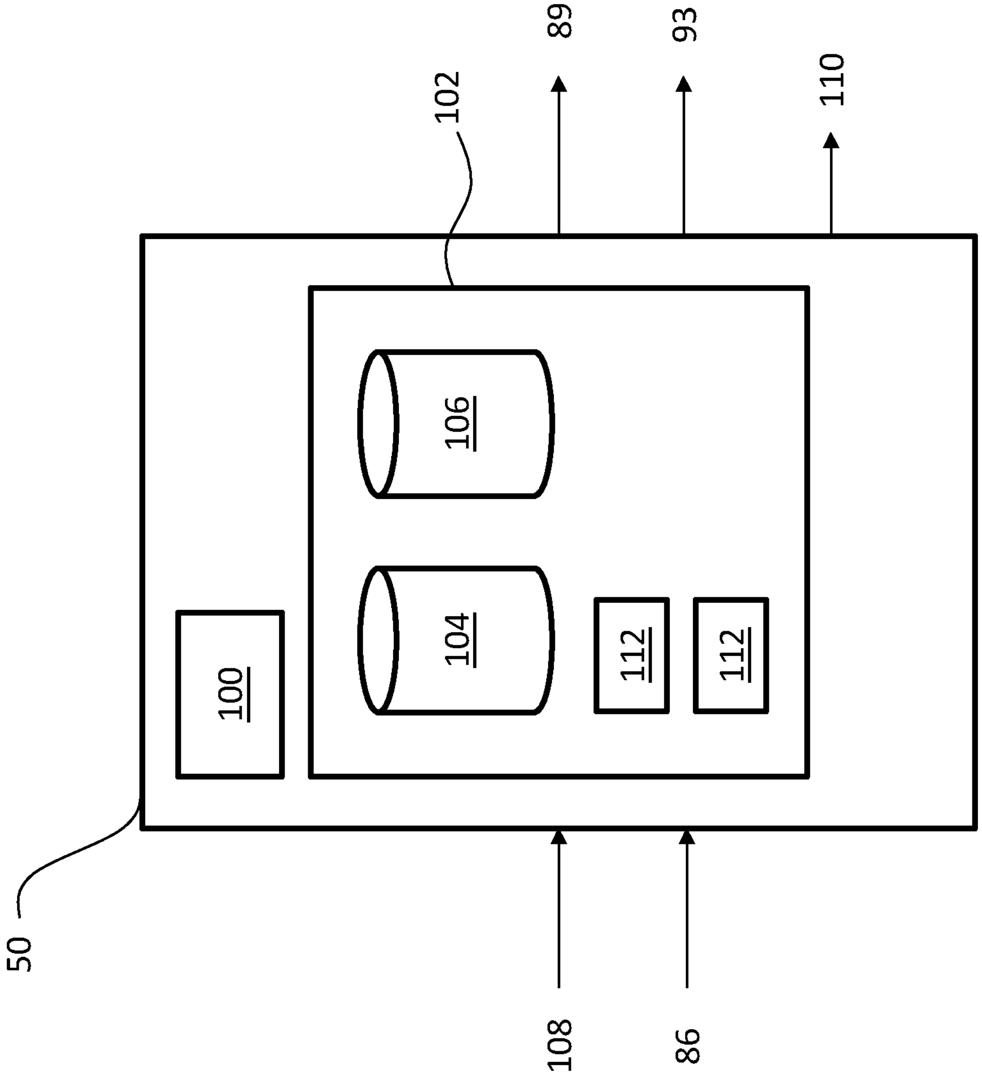
FIG. 5 is a schematic diagram of a controller.

FIG. 5 is a schematic diagram of the controller 50. The controller includes a processor circuit 100 in electronic communication with memory 102 which stores a database 104 of pump modules and which working chambers are fixedly associated with which pump modules, and a database 106 of which pump modules are currently connected to which hydraulic circuit portion. The controller receives demand signals 108 which are indicative of a demand for working fluid by each of the first and second hydraulic circuit portions and the shaft position and/or speed signal through signal line 86. The demand signal 108 could be a simple pressure signal, however as an alternate embodiment the demand signal might be in the form of an electronic joystick position signal, whilst an additional pressure signal is provided as an input to the controller. Output from the controller includes working chamber valve control lines 89, 93 (for controlling LPVs and, if required, HPVs) and valve switching control lines 110 which actuate the diverting valves 52, 54 within the apportioning blocks.

The demand signals may be relatively simple, for example a measurement of pressure at the hydraulic input to the respective hydraulic circuit, or more complex, for example signals representing both pressure and flow requirements of the respective hydraulic circuits. The controller may receive signals indicative of demand by individual actuators or from an operator of the apparatus through manual controls. This latter approach enables compatibility with pre-existing hydraulic apparatus.

During operation, the controller maintains the database of which pump modules are connected to which hydraulic circuit portion, starting from a default configuration. The controller also maintains accumulators (which are internal variables stored in the controller) 112 of the difference between demanded volume of hydraulic fluid and delivered volume of hydraulic fluid to each hydraulic circuit portion by pump modules connected to the respective hydraulic portion. As the rotatable shaft turns, decision points are reached at different times (shaft positions) for the various working chambers. At the decision point for a given working chamber, the controller determines which hydraulic circuit module the working chamber is connected to (which requires querying the database 104 of pump modules and which working chambers are fixedly associated with which pump modules, and the database 106 of which pump modules are currently connected to which hydraulic circuit portion) and the controller then updates the accumulator of the hydraulic circuit portion to which the working chamber is connected depending on the received demand for that circuit portion. The controller then compares the accumulator value with a threshold and if the accumulated demand exceeds the threshold, it schedules then transmits valve controls signals to cause the working chamber to carry out an active cycle in which the working chamber makes a net displacement of working fluid and subtracts the net displacement of working fluid from the value stored by the accumulator. Otherwise, it causes the working chamber to carry out an inactive cycle in which the working chamber makes no net displacement of working fluid (for example, the controller may transmit a signal to the LPV of the working chamber to hold the LPV open throughout a cycle of working chamber volume) and the accumulator is not modified. In this way, the controller makes decisions for each working chamber as to whether or not to carry out active cycles depending on the demand from the hydraulic circuit portion to which the working chamber is connected. The accumulators and demand signals may use any convenient units. In one known example, the demand is expressed as "displacement fraction" which is a fraction of the maximum possible displacement per revolution of the rotating shaft, referred to as $F_d$. Target flow rate, in volumetric terms, is a product of $F_d$ and the speed of rotation of the rotatable shaft.

From time to time, the controller will determine that there is a requirement to reallocate a pump module from one hydraulic circuit module to another hydraulic circuit module in order to meet changing demand for hydraulic fluid. In this case, the controller transmits a control signal to the relevant valves in the apportioning module to switch the high pressure manifold of the pump module from one hydraulic circuit module to another hydraulic circuit module (the other hydraulic circuit module in embodiments with two hydraulic circuit modules) and it updates the database 106 of which pump modules are currently connected to which hydraulic circuit modules. Thus, in future, when a decision point is reached for each working chamber of the pump module which has been switched from allocation to one hydraulic circuit module to another hydraulic circuit module, the controller reads the value of the displacement accumulator of the new hydraulic circuit module and thus the demand for hydraulic fluid by the new hydraulic circuit module.

The moment in time that is chosen to reallocate a pump module is important, and the moment may be chosen in relation to the timing of the cycle of one or more working chambers, so as to minimise pulsation/ripple arising from those corresponding chambers. A forecast of flow, arising from the connected working chambers, can be used during this allocation process in particular to choose the moment in time to perform reallocation. Reallocation may be performed to increase flow provision, or simply flow capacity for some future time.

Notably, the controller may deliver hydraulic fluid with quite different pressure and flow rates to each hydraulic circuit portion at the same time. In a simple example, the pressure at the input to the hydraulic circuit portions is measured and the accumulator for each hydraulic circuit portion is incremented with time in proportion to the error between the measured pressure and a set point pressure. The error may also be integrated over time and added to the accumulator. The pressure set points may be different for each hydraulic circuit portion and may be rapidly varied in response to loads on the actuators, or proportional valve positions. For example in response to a significant increase in pressure set point, each allocated working chamber could carry out an active cycle until the revised pressure set points was obtained. Additionally, if an actuator increased the amount of flow it was absorbing, the many working chambers would need to undergo active cycles to maintain the pressure set point Furthermore, the hydraulic circuit portions may receive very different volumes of hydraulic fluid as the net displacement of working fluid by the pump modules connected to each hydraulic circuit portion are entirely independent although working chambers connected to each hydraulic circuit portion are driven by the same engine through the same shaft.

Although the controller is shown here as being implemented by a single processor one skilled in the art will appreciate that the function of the controller may readily be distributed between a plurality of processors and/or circuits.

Figures 6A, 6B, 6C:
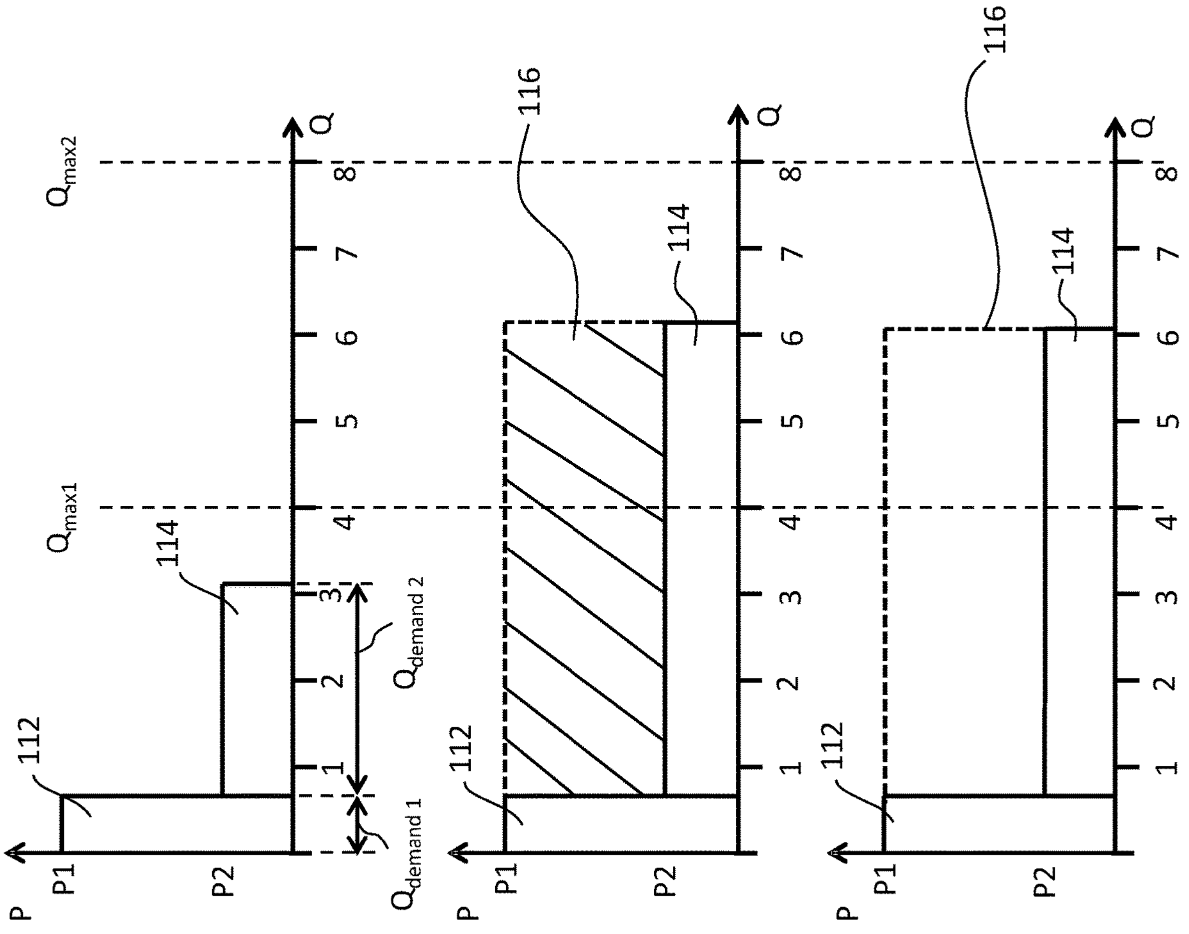
FIGS. 6A, 6B and 6C are graphs of flow demand (x axis) versus pressure (y axis) for two hydraulic circuit portions for a prior art machine without pumped flow merging, at low load (6A); a prior art machine with conventional pumped flow merging at high load (6B); and a machine according to the invention (without merging) at high load (6C)

The benefits of the invention can be seen from FIGS. 6A through 6C. FIG. 6A shows the operation of a conventional hydraulic machine, such as an excavator, having tandem pumps which drive first and second hydraulic circuit portions with respective groups of actuators, with a control valve block allowing selective combining of the flow from the tandem pumps, while the flow is not combined and at a relatively low demand level. The x-axis shows flow rate and is numbered in terms of the number of pump modules to deliver the required flow rate. I.e. a required flow rate on the x-axis between 3 and 4, will require no fewer than 4 pump modules (even for a required rate which is only marginally above 3). In this case it assumed that each pump module has the same number of working chambers, n, each of the same capacity and so m pump modules delivers the maximum flow output of m×n working chambers. $Q_{max1}$ is the maximum flow rate which can be delivered using working chambers of one pump (equivalent to 4 pump modules) and $Q_{max2}$ is the maximum flow rate which can be delivered using working chambers of two pumps (equivalent to 8 pump modules). The y-axis shows pressure. The area of portion 112 shows the power output (pressure×flow rate) for the first hydraulic circuit portion at output pressure P1 and flow rate $Q_{demand1}$ The area of portion 114 shows the power output for the second hydraulic portion at output pressure P2, which is lower than P1, and flow rate $Q_{demand2}$, which is higher than $Q_{demand1}$ Similar total power outputs are provided to the hydraulic circuit portions but with quite different pressure and flow rate characteristics.

With reference to FIG. 6B, in a conventional excavator circuit, when one hydraulic circuit portion requires a greater flow rate of hydraulic fluid than can be met with one pump ($Q_{max1}$), the control valve block combines the flow from both pumps so that the flow requirement can be met, but this means that the power output is determined by the product of the higher pressure requirement P1 and the total flow requirement. Thus, instead of a power requirement equal to the product of pressure required and flow requirement of the first hydraulic circuit portion 112, and also the product of the pressure required and flow requirement of the second hydraulic circuit portion 114, power is wasted, represented by portion 116. In practice this is dissipated by throttling fluid flow. This demonstrates that the conventional excavator arrangement is inefficient when one hydraulic circuit portion demands high-pressure low-flow and the other demands low-pressure high-flow.

FIG. 6C shows what may be achieved using the invention. In this example, the second hydraulic circuit portion has a flow requirement which requires 6 of 8 available pump modules, at relatively low pressure P2, and the first hydraulic circuit portion has a flow requirement which can be met by a single pump module of 8 available pump modules, albeit at relatively high pressure P1. The controller switches 6 of the pump modules to the second hydraulic circuit portion, allocating only 1 pump module to the first hydraulic circuit portion and so can deliver the appropriate flow requirement 112 to the first hydraulic circuit portion and the appropriate flow requirement 114 to the second hydraulic circuit portion without the wasted energy represented by portion 116. Accordingly, the invention has provided a method to efficiently meet the requirements of the first and second hydraulic circuit portions.

The controller uses demand signals from the various hydraulic circuit portions in order to determine the net displacement of working fluid of the working chambers in the pump module(s) connected to the respective hydraulic circuit portions and also to determine when to switch pump modules from one hydraulic circuit portion to another. The demand signals may be used for feedback control of displacement. For example, demand signals may comprise or be determined from a measure of pressure in the hydraulic circuit portion (at some or all of the input to the hydraulic circuit portion, at a conduit extending to an actuator, or at an output to tank of the hydraulic circuit portion, for example, across a throttle (orifice) at an output of the hydraulic circuit portion), and also signals from manual controls, such as a joystick position signal. The demand signals may be used for feedforward control. For example, a demand signal may be determined from a user interface (e.g. manually operable control such as a joystick position), or a demand calculated by the controller (e.g. in response to current or intended activities of the apparatus) or demand derived from spool valve commands within the hydraulic circuit portions (e.g. pilot valve pressures) and/or the position of proportional valves.

In a largely redesigned application, the actuators allocated to the first and second hydraulic circuit portions can be selected as required, for example the first portion may have the swing motor, dipper primary actuator, boom secondary actuator, and one side of the travel and the second portion may have the dipper secondary, boom primary, bucket, and the other side of the travel.

In a largely conventional application, where the invention is retrofitted to existing apparatus, the actuators are already allocated to hydraulic circuit portions.

Figure 7:
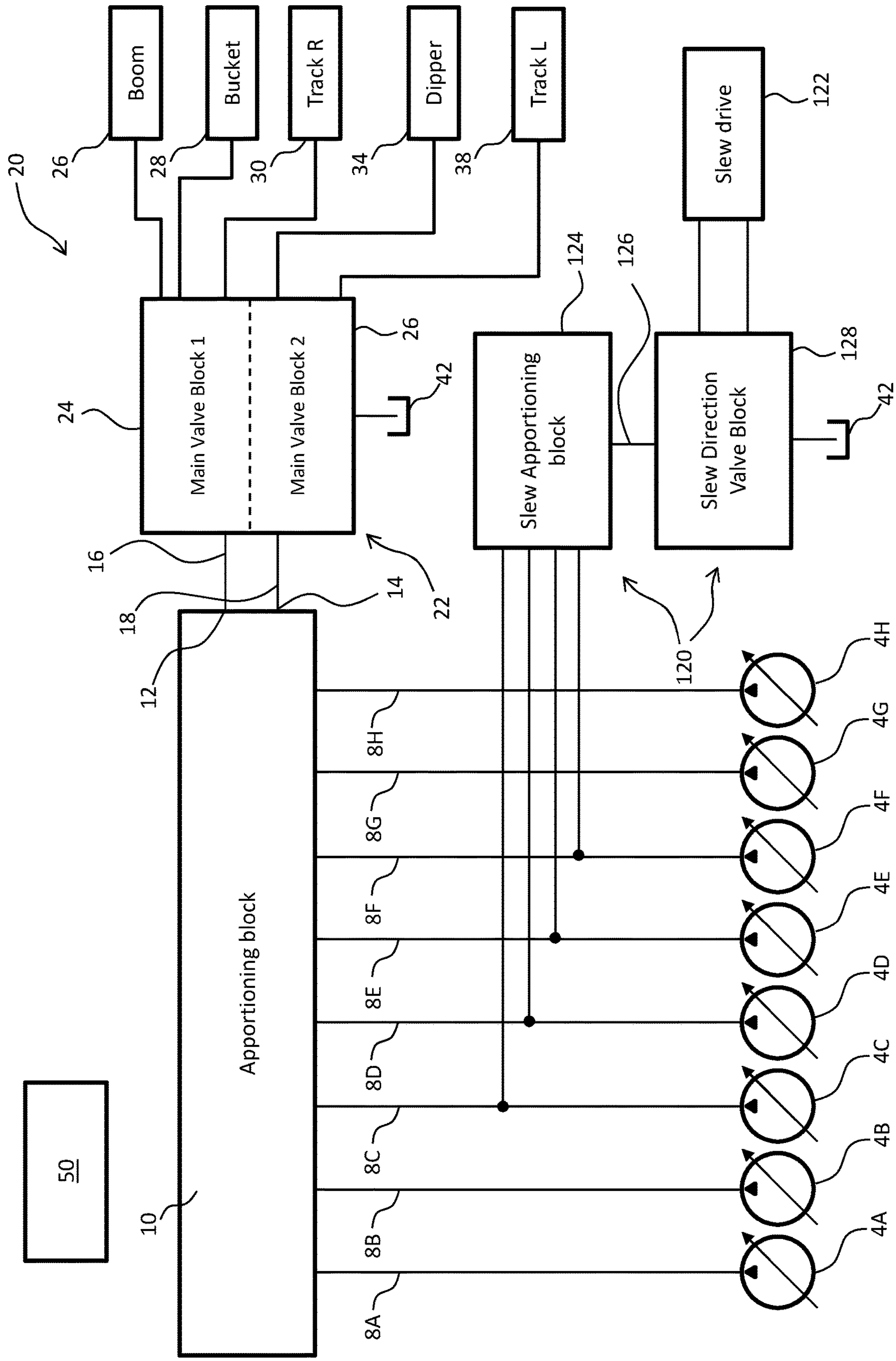
FIG. 7 is a schematic diagram of a hydraulic apparatus with three hydraulic circuit portions.

FIG. 7 is a schematic diagram of an alternative system architecture in which there is a third hydraulic circuit portion 120. The third hydraulic circuit portion includes a hydraulic slew drive 122 (which may for example control slew of the vehicle body in an excavator). A further apportioning block 124 is in communication with the high pressure manifolds 8C, 8D, 8E, 8F of four (i.e. only some) of the pump modules and, as with the main apportioning block 10, it contains valves which are controllable by the controller to switch the pump modules to a respective hydraulic circuit portion input 126 (the input to the third hydraulic circuit portion). This third input is connected to the slew drive through a slew direction valve block 128 which regulates fluid flow to cause the apparatus to slew clockwise or anticlockwise as required. The switchable valves of the further apportioning block are controlled by the controller in concert with the switchable valves of the main apportioning block 10 so that the pump modules 4C, 4D, 4E, 4F which are connectable to the third hydraulic circuit portion are connected to only one of the three hydraulic circuit portions at any time. Thus, the output of pump modules 4A, 4B, 4G and 4H may be diverted to the first or second hydraulic circuit portions and the output of pump modules 4C, 4D, 4E and 4F may be diverted to the first, second, or third hydraulic circuit portions. The controller receives a demand signal for and maintains an accumulator for the third hydraulic circuit portion to thereby adapt the displacement of working fluid to the third hydraulic circuit portion to meet demand. The further apportioning block may be integrated with the main apportioning block.

As shown in FIGS. 1 and 2, within the hydraulic circuit portions, bypass valves (typically spool valves) 32 and 40, can be provided to selectively route hydraulic fluid directly to specific actuators (the boom in the case of boom bypass valve 32 and the dipper in the case of dipper bypass valve 40), bypassing the proportional valves in the main valve control blocks. This is advantageous because for actuators (such as the boom or dipper function) which may consume a particularly high volumetric flow rate of hydraulic fluid, the proportional valve may lead to an excessive loss of energy through throttling or even prevent sufficient hydraulic fluid from being supplied to these functions. This is especially useful when fitting the current invention into existing excavator apparatus, whereby the primary spool would throttle too much power, and the pressure drop would be too high. Existing excavator apparatus would service some actuators via a primary and secondary spool. To retrofit the present invention (e.g. to an excavator) the secondary spool for the actuators would be shut off. (If the present invention is designed in during manufacture rather than retrofitted, it does not need a bypass spool, and could just have one higher capacity spool.

In the embodiment of FIG. 7, the slew circuit can therefore be connected to one or more pump modules directly, without any proportional valve therebetween (as would be common in a conventional excavator). Furthermore, the pump modules connected to the slew actuators may be accurately controlled based on a demand signal concerning only the slew function. This arrangement is energy efficient (as it omits proportional valves and reduces or avoids throttling) and allows fine control of actuator movement (as the working chambers of the respective pump modules in direct fluid communication with the slew actuators are operated in displacement control mode).

One skilled in the art will appreciate that the third hydraulic circuit portion and any other further hydraulic circuit portions may be connected to any subset of, or even all of, the pump modules. However, it may not make sense due to maximum flow requirements on a specific actuator to allocate all pump modules to that actuator.

In the embodiment of FIGS. 1 and 2, there are 256 possible combinations of connection of pump modules to the first and second hydraulic circuit portions (254 of which provide at least some flow to both hydraulic circuit portions), although if the pump modules all have the same capacity, there are effectively 9 different choices as to how many pump modules are allocated to each hydraulic circuit portion.

In some embodiments, one or more of the pump modules is fixedly connected to one of the circuit portions, and respective fluid flow does not pass through apportioning valve. The working chambers of the fixed allocation pump modules are always controlled, along with the working chambers of any other pump modules currently connected to the same circuit portion, to together meet the demand for hydraulic fluid of that circuit portion.

In an example 8 pump modules can be connected as follows:

Pump module 1: Circuit portion 1 only

Pump module 2: Circuit portion 1 only

Pump module 3: Circuit portion 2 only

Pump module 4: Circuit portion 2 only

Pump module 5: Circuit portion 1 or 2

Pump module 6: Circuit portion 1 or 2

Pump module 7: Circuit portion 2 or 3 (which may be a swing or slew circuit, for example)

Pump module 8: Circuit portion 2 or 3 (which may be a swing or slew circuit, for example)

In this case circuit portion 1 may receive the output of up to 5 pump modules; circuit portion 2 may also receive the output of up to 5 pump modules and circuit portion 3 may receive the output of up to 2 pump modules. The inclusion of a number of pump modules which are fixedly connected/allocated to specific hydraulic circuit portions can reduce complexity and cost, but it also reduces the flexibility.

Figure 9:
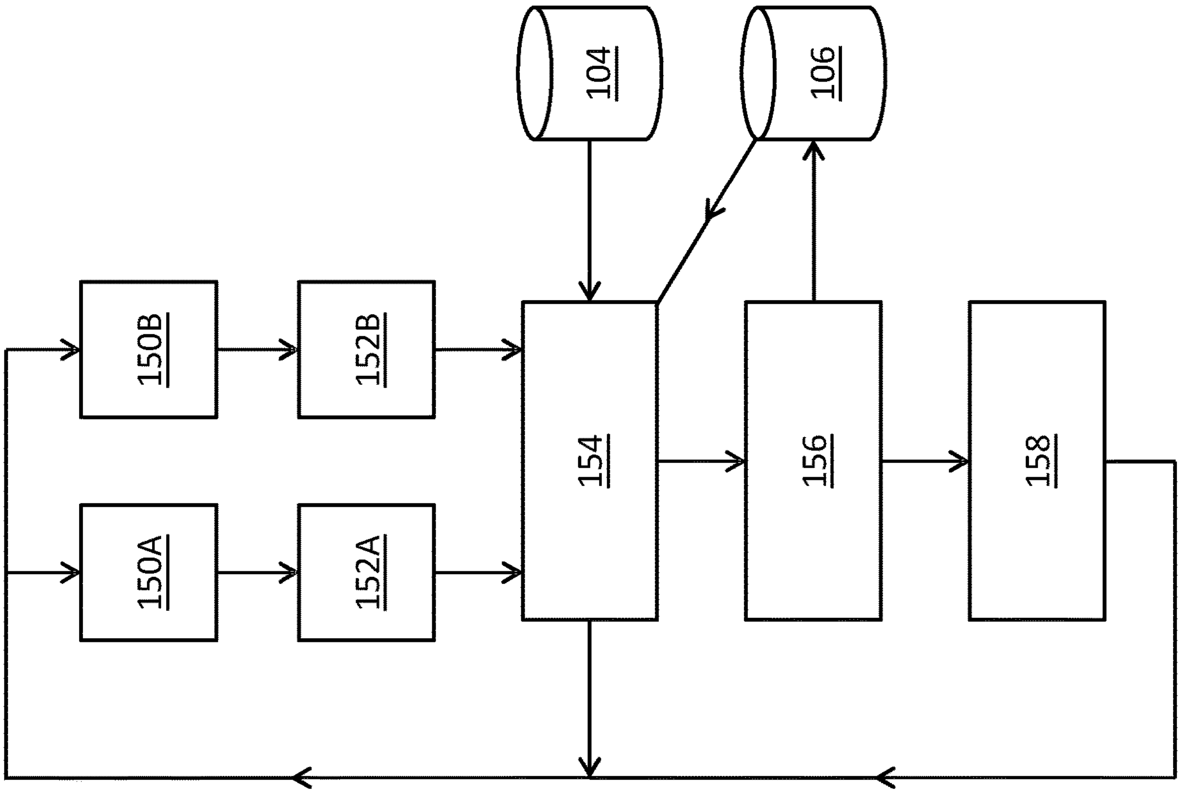
FIG. 9 is a flow chart of an operating procedure for reallocating pump modules to hydraulic circuit portions.

FIG. 9 is a flow chart of an operating procedure carried out by the controller to regulate the switching of pump modules from one hydraulic circuit portion to another. On an ongoing basis, the controller monitors the flow required by the first hydraulic circuit portion 150A and by the second hydraulic circuit portion 150B. The controller than periodically calculates 152A, 152B the number of working chambers/PCUs required to supply the required flow of fluid to the first and second hydraulic circuit portions. Then, with reference to databases 104, 106, the controller determines whether the working chambers which are part of the pump modules currently connected to each hydraulic circuit portion are sufficient to provide the required flow and whether they should be redistributed. If there is no requirement to change the allocation, then the procedure continues again from the beginning. Otherwise, the controller determines 154 that one or more pump modules should be reallocated, it decides 156 which pump module or modules should be reallocated and then updates the database 106 of which pump modules are allocated to which hydraulic circuit portions and sends valve control signals 158 to the diverting valves 52, 54 to implement the change. Details around this changeover procedure are described further below. When decision points as to whether to cause individual working chambers to carry out active cycles are reached in the future, the controller will automatically consider the demand and the demand accumulator for the hydraulic circuit portion to which the relevant working chambers are connected when determining whether the respective working chamber should undergo an active or an inactive cycle of working chamber volume.

The controller also considers limits for the torque, flow or power output of individual pump modules and these are dynamically varied as pump modules are reallocated from one hydraulic circuit portion to another.

When the total demand for fluid by all hydraulic circuit portions is within the overall capacity of the hydraulic machine, pump modules can be allocated to hydraulic circuit portions such that the total number of working chambers allocated to each hydraulic circuit portion will supply the demanded displacement, with rounding up as required.

If however the total demand for fluid by each hydraulic circuit portion exceeds the overall capacity of the hydraulic machine—or cannot be met given the number of working chambers in each pump module, the controller employs an alternative strategy.

In one strategy, when an overload criteria is met, the controller allocates pump modules having working chambers equal to one half of the total number available to the first hydraulic circuit portion and one half of the total number available to the second hydraulic circuit portion. Alternatively, one hydraulic circuit portion may be prioritised and be allocated sufficient working chambers to meet demand while the other hydraulic circuit portion is allocated the remainder of working chambers whose potential sum displacement is insufficient to meet demand. For example, it might be determined to prioritise a hydraulic circuit portion comprising steering actuators. There may be a default state of allocation of pumping module to hydraulic circuit portions to which the controller reverts where possible given immediate demand.

For example each hydraulic circuit portion may be allocated a proportion of working chambers equal to its current or time-averaged or predicted displacement demand as a fraction of the total current or time-averaged or predicted displacement demand, without rounding as required.

When it is determined that a pump module is to be reallocated from one hydraulic circuit portion to another, the pump module(s) to be reallocated may be selected taking into account one or more of:

- a preference for particular pump modules or a particular number of pump modules to be commoned, or
- a preference or requirement for a particular pump module or pump modules to be excluded from supplying fluid to one or more hydraulic circuit portions, or
- a requirement such as ensuring smooth flow of hydraulic fluid/reducing flow ripple (and therefore considering which pump module would, if connected to a particular hydraulic circuit module, give smoothest flow during the transition), minimising the number of diverting valve switching events (to minimise wear), distributing use (and therefore wear) among different pump modules, switchable valves etc. This may be a primary requirement.

In some embodiments pump modules are reallocated when a flow or displacement demand (by a hydraulic circuit portion) exceeds a threshold. This is especially useful where there are three or more hydraulic circuit portions. For example, when the demand signal is representative of a target flow rate ("flow domain" control), allocation of a further pump module to a hydraulic circuit portion may be triggered $Q_{demand}>Q_{n-1}$ (where $Q_{demand}$ is the flow demand, and $Q_n$ is the maximum flow associated with a number (n) of pump modules allocated to the respective hydraulic circuit portion). This control method seeks to retain an excess of potential displacement. E.g. If the flow demand $Q_{demand}$ is 65 litres per minute (LPM) and n=2 (where the maximum flow of one pump module is 60 LPM), then $Q_{n-1}$ is 60, and the condition of the equation is met, and thus the number n should increase. In this example, a pump module would be allocated, increasing the total capacity of the pump modules allocated to the respective hydraulic circuit portion, and the condition of the equation would be false (65<120). The allocation, and the value of n, would remain constant until the triggering condition is again true. One skilled in the art can see the equation can be readily varied to make more conservative (e.g. $Q_{demand}>Q_{n-1.5}$), or to make less conservative ($Q_{demand}>Q_{n-0.5}$) The latter carries the risk that the demanded displacement by a hydraulic circuit portion may in course exceed that available from the pump modules connected to the respective connecting circuit output.

Alternatively, instead of providing a trigger in the flow domain, it may be that demand is signalled in terms of displacement fraction (Fd, the fraction of maximum possible displacement per rotation of the rotatable shaft). As the demand displacement fraction for a given hydraulic circuit portion approaches the maximum available displacement fraction, another pump module should be allocated to the respective hydraulic circuit portion. The threshold demand which triggers allocation of an additional pump module may be a predetermined fraction of the maximum displacement associated with the pump modules currently allocated to the respective hydraulic circuit portion. For example, for a threshold of 0.9, when displacement demand transitions from below 0.9 to above 0.9 of the maximum displacement by the working chambers of the pump modules connected to the hydraulic circuit portion, an additional pump module would be allocated and join the group. This would trigger a change in the Fd commanding the working chambers in the respective group of pump modules, since the total available displacement of the hydraulic circuit portion has changed.

A group of pump modules may exist as a 'pool' from which modules are selected for allocation for use. Pump modules surplus to requirement, are thus unselected/deallocated.

The physical state of the switchable valves (of the hydraulic connecting circuit) may mean that a pump module is connected to a hydraulic circuit portion, and if the respective working chambers operate in an idle mode, no pressurised fluid is communicated to or from the high pressure gallery and the respective working chambers. Thus the controller might deem such a pump module as 'deallocated' and so not contributing to meeting demand for the hydraulic circuit portion to which it is connected. In the same physical valve switching state, it may also be said that the pump module is 'allocated' (irrespective of the mode of the respective working chambers).

The reallocation of a pump module from one hydraulic circuit portion to another hydraulic circuit portion may be determined based on current demand (e.g. flow demand) or an estimate or a prediction of demand. The controller may predict future increases or decreases in demand, for example they may detect a standard or repeating demand cycle (for example a common sequence of movement of the various actuators of an excavator while it carries out a common tasks, for example, digging, lifting, rotating and then dropping matter). The controller may measure a particular gradient in demand. In response, the controller may reallocate one or more pump modules from one hydraulic circuit portion to another based on a predicted future demand, in advance of the demand occurring. The controller could take into account typical ramp rates or gradients of the demand signal. The controller may also take into account data from sensors (e.g. accelerometers, vibration sensors, tilt sensors), for example, it may be detected that the device is on a gradient, or moving, or not moving.

In any case, hysteresis may be provided, such that the transition (allocation, or de-allocation) between the number of pump modules connected to a hydraulic circuit portion is not triggered unnecessarily. An example of an unnecessary transition might be where it is caused by a temporary/dynamic oscillation in displacement demand around the (flow or displacement) threshold level, where the oscillation does not follow a longer term trend or steady state. The usual trigger level for requiring allocation of an additional pump module may be higher than the usual trigger level for permitting removal of a pump module to connect to another hydraulic circuit portion to create this hysteresis.

When a pumping module is switched from one hydraulic circuit portion to another hydraulic circuit portion it may be necessary for the controller to amend data concerning working chamber active cycle allocation and accumulated demand. In the example given above, accumulators are used to store accumulated unmet demand by hydraulic circuit portion in absolute units, for example units of volumetric flow rate, and are incremented proportionally to demand and decremented by the volume of fluid displaced by a working chamber when a working chamber carries out an active cycle.

Figure 10:
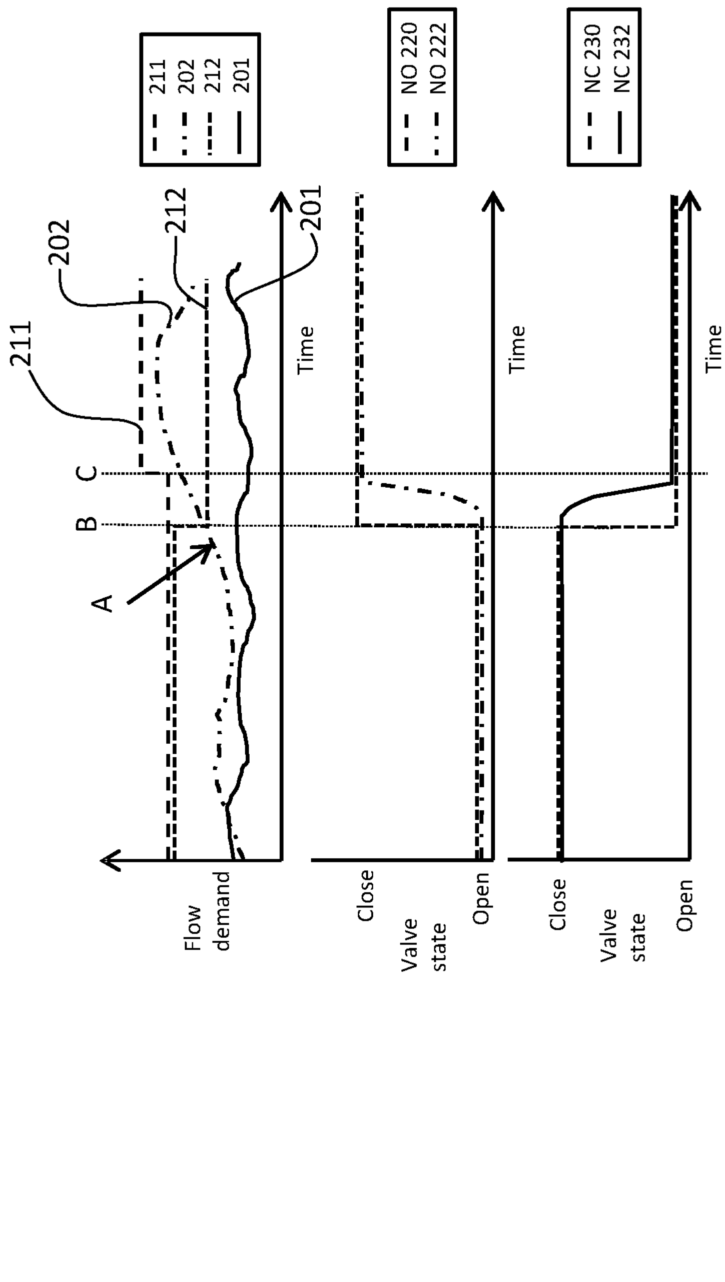
FIG. 10 illustrates the changes with time in flow demand signal and maximum flow capacity for each of two hydraulic circuit portions, and diverting valve control signals and positions during a process of reallocating a pump module from hydraulic circuit portion 2 to hydraulic circuit portion 1.

FIG. 10 shows the controlled switching process when a pump module is reallocated from one hydraulic circuit portion to another (hydraulic circuit portion 2 to hydraulic circuit portion 1). The demand signals 201, 202, for hydraulic circuit portions 1 and 2 are expressed in terms of flow rate and vary with time. In this example, each hydraulic circuit portion initially has the same number of pump modules allocated to it, each having the same number of working chambers, each of which have the same capacity, thus the maximum flow rate 211, 212 which can be delivered to hydraulic circuit portions 1 and 2 respectively are initially the same as each other. The middle and lower traces illustrate the valve control signals 220, 230 and valve positions 222, 243 (open or closed) for the normally open and normally closed valves 52, 54 respectively for an individual pump module (for example pump module 4A) which is initially connected to one of the hydraulic circuit portions (e.g. portion 2).

At time 'A' the demand signal for the other of the hydraulic circuit portions (portion 1) exceeds a threshold and the controller makes a decision to reallocate one or more pump modules from hydraulic circuit portion 2 to hydraulic circuit portion 1, to increase the maximum possible flow to hydraulic circuit portion 1. (In some embodiments, demand falling below a threshold may trigger deallocation of a pump module from a hydraulic circuit portion, causing it to be reallocated to another hydraulic circuit portion, for example to distribute capacity evenly between hydraulic circuit portions). The determination of how many pump modules should be reallocated to hydraulic circuit 1 may take into account whether hydraulic circuit 2 will continue to be able to meet its demand without one or more pump modules, taking into account demand thresholds; the application of prioritisation logic, for example prioritising flow capacity of a hydraulic circuit portion that feeds steering actuators.

Once the controller has determined at time A that one or more pump modules should be reallocated from hydraulic circuit portion 2 to portion 1, at time B the controller sends commands to the diverting valves 52, 54 (commands may include starting a solenoid current to open or close a valve or stopping a solenoid current to allow a normally open valve to open or a normally closed valve to close). The diverting valves take time to move and reach their new state at time C. During this time the controller updated database 106(not shown) as to which pump modules are allocated to which hydraulic circuit portions. Thus the controller will begin to take into account the revised allocation of pump modules and therefore working chambers to hydraulic circuit portions when making working chamber displacement decisions.

Nevertheless, in some embodiments, during the period of time between sending the commands to the diverting valve, the controller causes working chambers of the pump module which is being reallocated to commence only inactive cycles with no net displacement of working fluid. This minimises flow during the switching process. It may be that the controller causes working chambers of the pump module which is switching to carry out only inactive cycles from time A, when the decision is made, because once a working chamber has been committed to carry out an active cycle by closure of the LPV, that cannot be stopped until the shaft has rotated by a predetermined angle and if it is desired to avoid any working chamber carrying out an active cycle during switching of the diverting valves, then a period of time is required first for working chambers to complete any active cycles which are currently underway. The controller may wait for working chambers within the pumping module which is to be switched to reach a particular state (phase) and or wait for the flow from the pumping module to fall below a particular threshold before activating the diverting valves.

It is possible for the timing of closure of LPVs to be synchronised with the timing of movement of diverting valves, to delay active cycles of working chamber volume until the diverting valves have finished reconnection of the pump module containing an individual working chamber between hydraulic circuit portions. Typically it is the timing of LPV closure which is varied as LPV closure is typically much quicker than the opening of closing of diverting valves.

It is also possible for the controller to carry out one or more active cycles of working chamber volume prior to a reallocation of a pump module from one hydraulic circuit portion to another to deliberately increase the pressure in the high pressure manifold of the pump module, for example to close to or at the pressure of the apportioning manifold/input to hydraulic circuit portion to which the pump module is to be connected. This can reduce transient pressure fluctuations.

Figure 11:
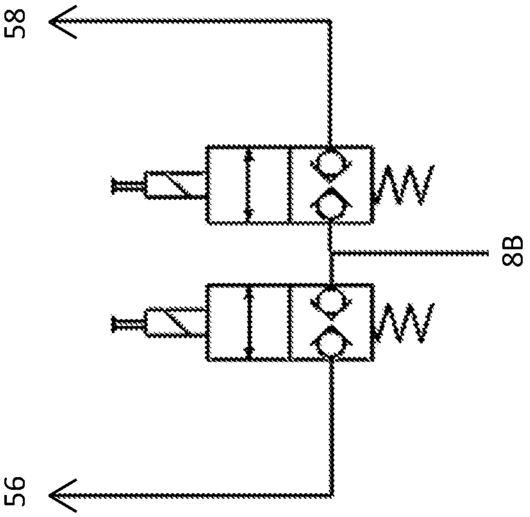
FIG. 11 is a schematic diagram of an alternative diverting valve arrangement.

In some embodiments, the switching of the diverting valves is staggered, i.e. it may be that the valve within a pair of valves as a unit (as shown in FIGS. 8,11) which is to be changed from closed to open is kept open until the other valve of the pair has opened; alternatively the valve which is to be changed from open to closed may be kept open until the other valve has closed. This reduces the risk of hydraulic deadhead.

Although the above example uses a normally open and a normally closed poppet valve, other switching mechanisms can be employed. For example, instead of the arrangement of FIG. 8, the arrangement of FIG. 11 uses a pair of double-blocking valves. In effect, the separate check valves of FIG. 8 have been incorporated into the diverting valves. Separate check valves are not required and it is especially important in this case to use the staggered opening/closing of valves when swapping a pump module between hydraulic circuit portions.

Figure 12:
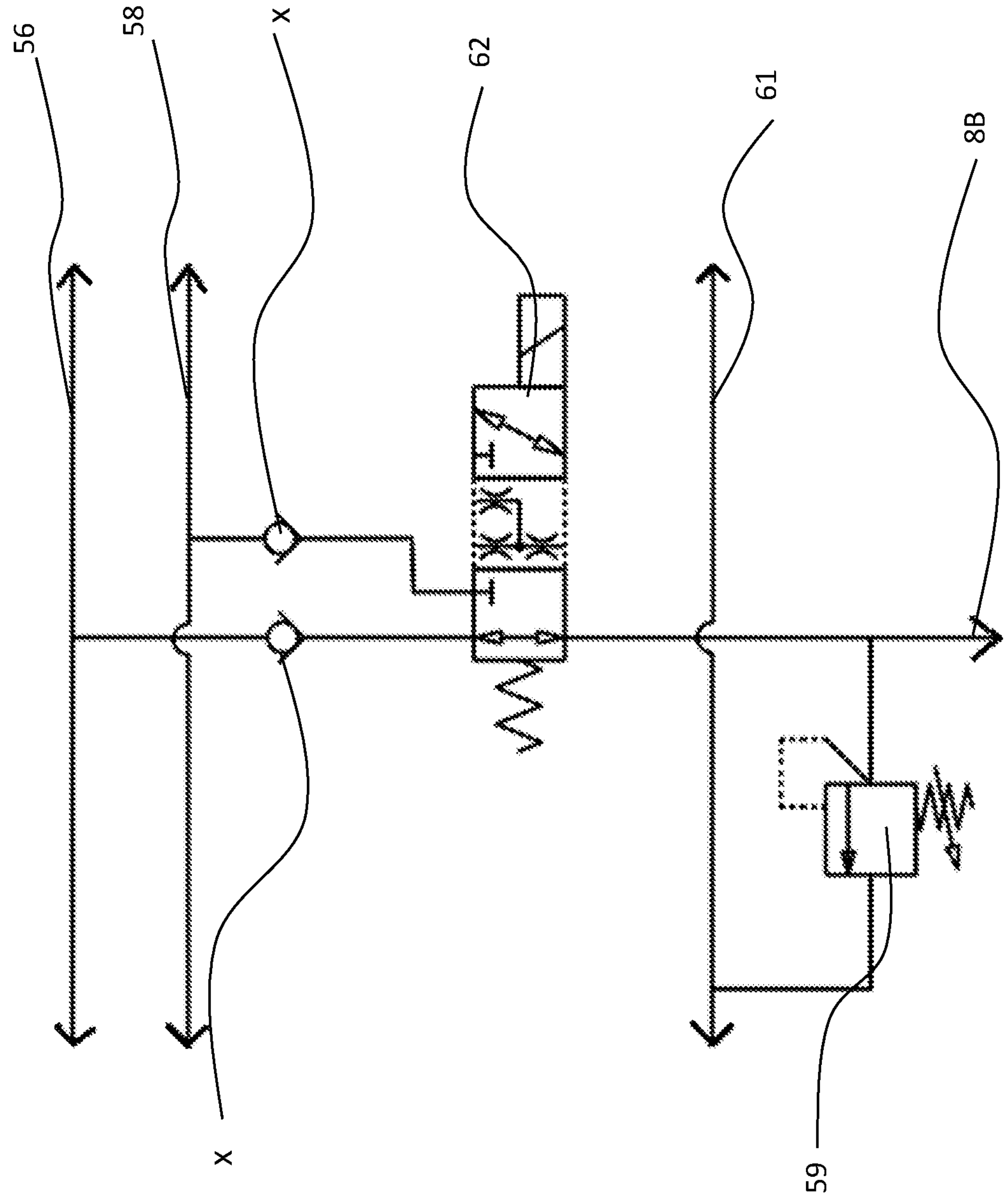
FIG. 12 is a schematic diagram of an alternative diverting valve arrangement.

FIG. 12 shows a further diverting valve embodiment which corresponds to the arrangement of FIG. 8 except that it employs a single switchable valve 62 instead of pair of poppet valves 52,54. The switchable valve has a first position in which the high pressure manifold 8B of an individual pump module is connected to the first apportioning manifold 56 and thus to the first hydraulic circuit portion, a second position in which the high pressure manifold is connected to the second apportioning manifold 58 and thus to the second hydraulic circuit portion and an intermediate portion in which it is connected to both but through orifices. The spool valve is switched between the first and second positions by the controller, and passes through the intermediate position only briefly. It is preferable for the high pressure manifold to be connected briefly to both apportioning manifolds than neither to avoid hydraulic deadhead although in some embodiments the intermediate position is blocking. A spring biases the valve to normally open to the first hydraulic circuit portion and normally closed to the second hydraulic circuit portion. This switching arrangement would also be useful, for example, for diverting flow to a third hydraulic circuit portion as per the embodiments of FIGS. 7,8,11,12, and 13 at least.

It would also be possible to use a spool valve with multiple positions corresponding to different flow configurations where the spool valve controls pilot flow to hydraulically actuated valves which open or close to allow flow in from a high pressure manifold to one or other hydraulic circuit portion depending on valve position. Thus flow from the pumping modules need not pass through the single spool valve.

Figure 13:
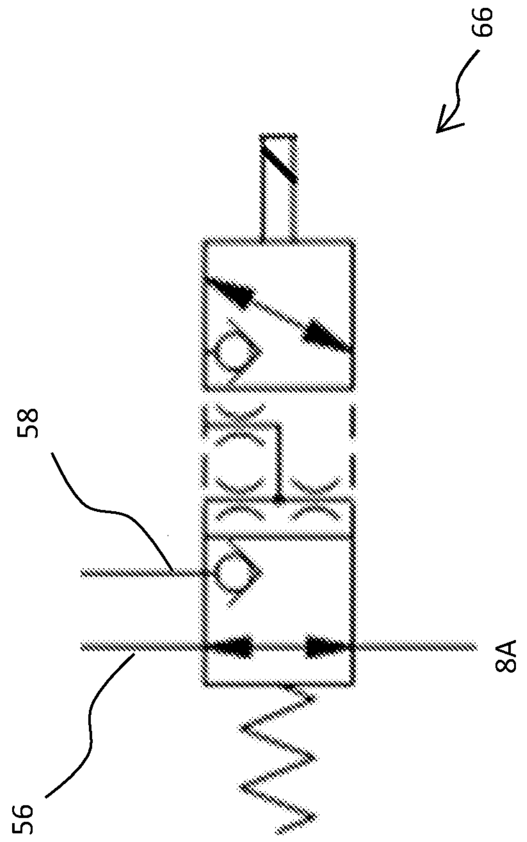
FIG. 13 is a schematic diagram of an alternative diverting valve arrangement.

FIG. 13 shows an alternative diverting unit which employs a multi-position poppet valve 66, which could be pilot operated or actuated by a solenoid. As with the valve of FIG. 12 it has first and second positions in which a high pressure manifold is connected to one or the other apportioning manifold (and thereby to a respective hydraulic circuit portion). There is an intermediate position between the first and second positions where the high pressure manifold is connected to both apportioning manifolds but through throttles (and typically also check valves to prevent back flow to the high pressure manifold of the respective pump module). The valve passes very briefly through the intermediate position as it is switched from the first position to the second position, or vice versa, by the controller.

Figure 14:
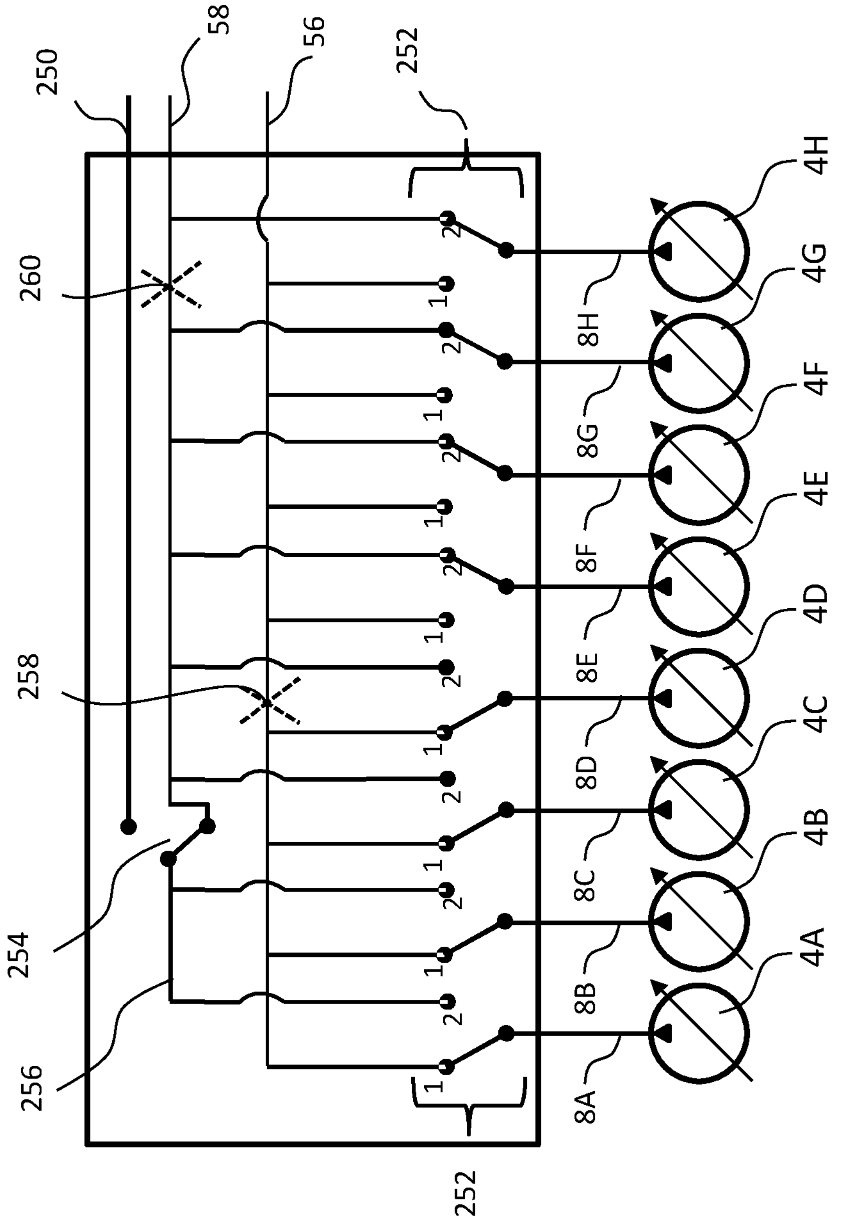
FIG. 14 is a schematic diagram of an alternative connecting circuit arrangement.

FIG. 14 is a schematic diagram of an alternative configuration of the connecting circuit which enables the switching of pumping modules between three different hydraulic circuit portions via manifolds 56, 58, 250 and so which can be used as an alternative to the connecting circuit of FIG. 7. The high pressure manifolds 8A—8H of pump modules 4A—4H may be switched between a first apportioning manifold 56 which is in communication with the first hydraulic circuit portion, a second apportioning manifold 58 which is in communication with the second hydraulic circuit portion and a third apportioning manifold 250 which is in communication with the third hydraulic circuit portion (used in this example for a slew function as per FIG. 7) with a plurality of diverting valves 252, which may take any of the forms described above and which are under the control of the controller, and a further diverting valve 254, also under the control of the controller. Any of the pump modules may be connected to the first apportioning manifold. With the further diverting valve 254 in the position shown, pump modules 4C through 4H may always be connected to the second apportioning manifold irrespective of the state of the further diverting valve, by switching the valves 252, associated with the respective pump modules, to position 2. When the further diverting is in the state shown, it connects switchable manifold portion 256 to the second apportioning manifold 58. In combination with this, pumps 4A and 4B, are selectively connectable to the switchable manifold portion through diverting valves 252 (in position 2), would in the positions shown be connected to the second apportioning manifold and so connected to the second hydraulic circuit portion. When the further diverting valve is switched to its alternative state (not shown), the switchable manifold portion is instead connected to the third apportioning portion. In combination with this, pumps 4A and 4B would be connected to the third hydraulic circuit portion (via the third apportioning portion) with an appropriate configuration of the diverting valves 252, to position 2. Pump modules 4A and 4B may therefore be switched simultaneously between the second and third hydraulic circuit portion by the controller actuating the respective further diverting valves. Alternatively the pump modules can be switched one at a time to or from the first hydraulic circuit portion and either the second or third hydraulic circuit portion depending on the position of the further diverting valve.

The further diverting valve may be located at a different position along the length of the first or second apportioning manifold. For example, if it was located at position 258 it might switch up to four pump modules between the first and third hydraulic circuit portions. If it was located at position 260 it might switch up to seven pump modules between the second and third hydraulic circuit portions.

Figures 15, 15A, 15B:
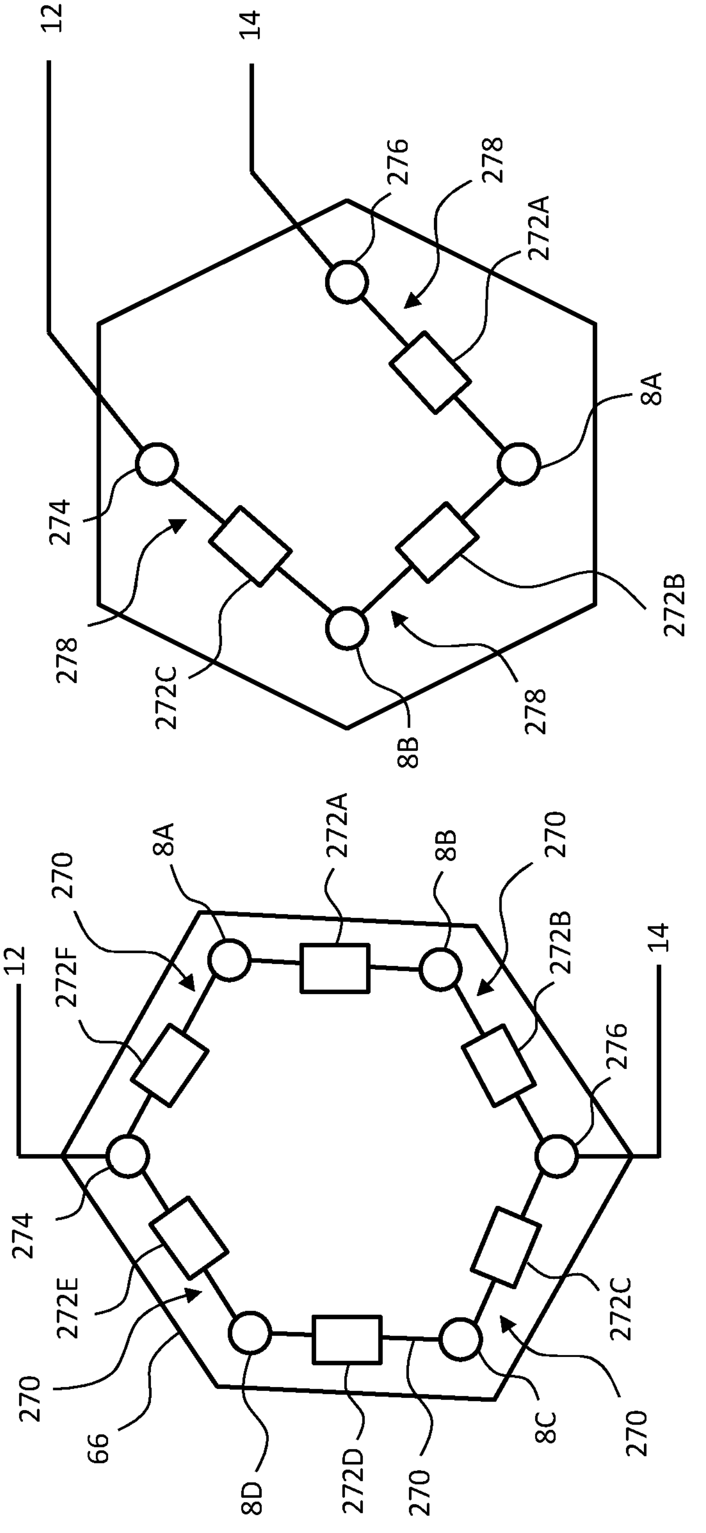
FIGS. 15A and 15B are schematic diagrams of further alternative connecting circuit arrangements.

With respect to FIG. 15A, a convenient location for the switchable valves (of the hydraulic connecting circuit/apportioning valves) is the endplate 66 of the hydraulic machine. In this case, conduits through the hydraulic machine which function as the high pressure manifolds 8A through 8D of pumps 4A through 4D connect to a ring conduit 270 in the endplate. This arrangement is convenient to form as the conduits extend at right angles to the plane of the endplate. First and second connecting circuit outputs 12, 14 from the hydraulic machine to the first and second hydraulic circuit portions respectively also extend from opposite ends of the ring conduit. Double blocking valves 272A through 272F under the control of the controller may be selectively closed. In use two of the double blocking valves are closed at any time to thereby define first and second apportioning manifolds in communication with the first and second connecting circuit outputs and so the first and second hydraulic circuit portions and with selected pump module high pressure manifolds. Thus, pump modules may be selectively connected to one or another of the hydraulic circuit portions but with the limitation that multiple pump modules connected to the same hydraulic circuit portions must be adjacent around the circumference of the ring conduit. Portions 274, 276 are connections between the ring conduit and the first and second connecting circuit outputs but may also communicate with conduits through the hydraulic machine which function as the high pressure manifold of a further pumping module, in which case there is a pumping module permanently connected to each of the connecting circuit outputs although the remaining pumping modules may be switched.

FIG. 15B illustrates an alternative in which instead of a ring conduit there is a C-shaped conduit 278 which communicates with conduits connected to four different pump modules. Any one of the double blocking valves 272A, 272B, 272C can be closed giving three different options whilst all others remain open. In a first option, with 272A closed, the pump module with high pressure manifold 276 is connected to the second output 14 and pump modules with high pressure manifolds 8A, 8B and 274 are connected to the first output. In a second option, with 272B closed, the pump module with high pressure manifold 276 and the pump modules with high pressure manifold 8A are connected to the first manifold and the pump modules with high pressure manifolds 8B and 274 are connected to the first output. In a third option with 272C closed, the pump module with high pressure manifold 276 and the pump modules with high pressure manifold 8A and 8B are connected to the first manifold and the pump module with high pressure manifold 274 is connected to the first output. The controller switches the double blocking valves are required to reallocate pumping modules.

In the embodiments of FIG. 15A and FIG. 15B, a third connecting circuit output, for a third hydraulic circuit portion, might be connected at any of the locations 8A, 8B, 8C, 8D.

Figure 16:
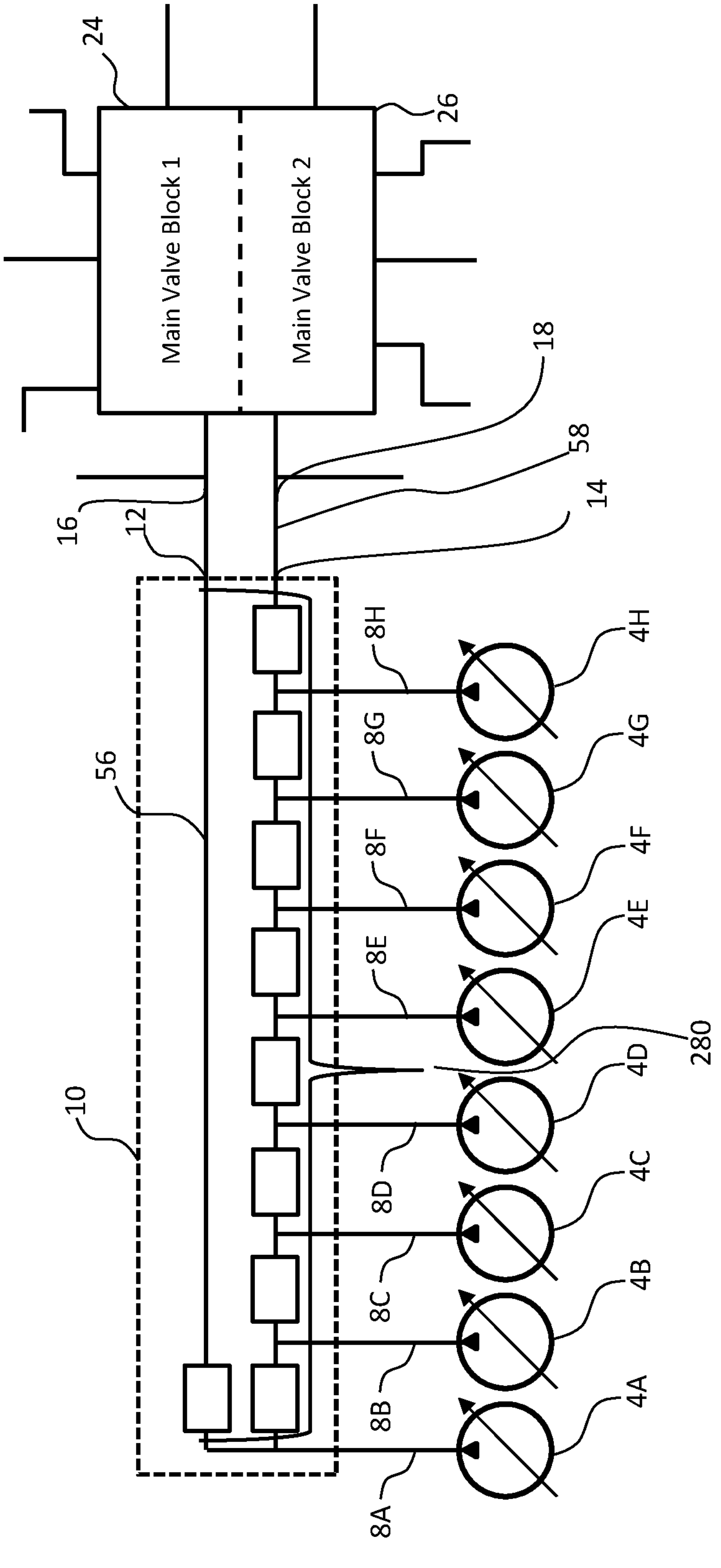
FIG. 16 is a schematic diagram of a further alternative connecting circuit arrangement.

In the embodiment of FIG. 16, the first apportioning manifold 56, extending to first output 12 and the first hydraulic circuit portion input 16 and second apportioning manifold 58, extending to the second output of the apportioning block and the second hydraulic circuit portion input 18 are connected together through 8 blocking valves 280, connected in series, with T junction connections to the high pressure manifolds 8A through 8H of 8 pump modules 4A through 4H between each blocking valve. The controller selects one blocking valve at a time to close, thereby splitting the pump modules between allocation to the first and second hydraulic circuit portion depending on the selected blocking valve.

Figure 17:
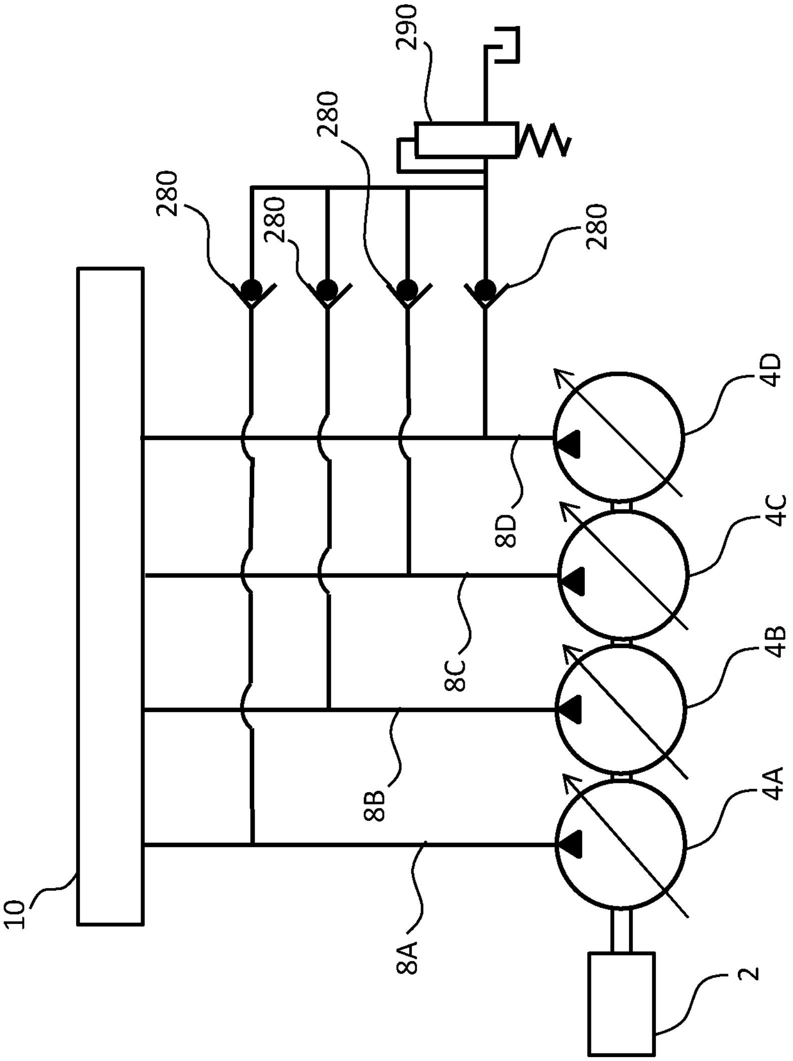
FIG. 17 is a schematic diagram of a pressure relief valve arrangement.

In case of an overpressure event, the apparatus typically comprises pressure relief valves. One may be provided per pump module but in the embodiment of FIG. 17 the high pressure manifold of each of four pump modules is connected, in parallel, through check valves 280 to a single pressure relief valve 290. The check valves are all upstream of the pressure relief valve and perform the function of checking flow in the event that the pressure behind the pressure relief valve is higher than the high pressure manifold pressure. The embodiment of FIG. 17 may be provided within or separate to the apportioning block.

In the apparatus described above, problems may arise after a demand for working fluid cannot be met due to competing requirements for pump modules, when the pump modules connected to a connecting circuit output (and thereby to a hydraulic circuit portion and/or a group of one or more actuators) are as a result unable to meet the demand, and when, due to a further increase in demand associated with the connecting circuit output, or a decrease is other competing demands, one or more additional pump modules are connected to the same connecting circuit output, thereby increasing the maximum displacement to the connecting circuit output. When this additional capacity becomes available, the actual displacement to the connecting circuit output (and thereby to a hydraulic circuit portion and/or a group of one or more actuators) suddenly jumps, leading to vibrations, juddering or difficulties in machine control (especially by a human operator).

Figure 18A:
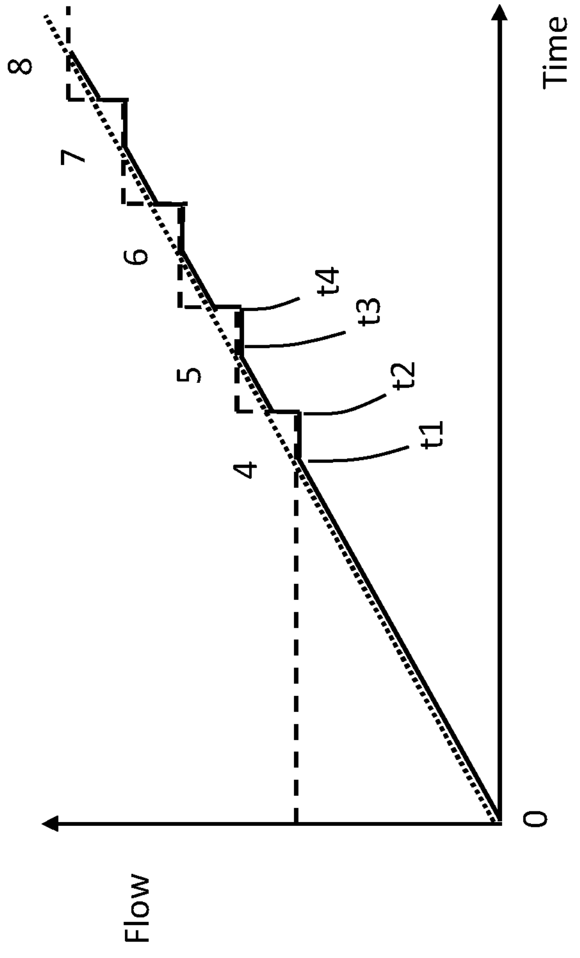
FIG. 18A is a plot, on the y-axis of maximum flow through a connecting circuit output (dashed line), and actual flow (solid line) for a given demanded flow (dotted line), over time (x-axis) when demand flow is ramped up linearly, without restricting the demand signals for individual outputs; the numbers represent the number of pump modules which are connected to a hydraulic circuit portion/connecting circuit output.

This is illustrated with reference to FIG. 18A which shows the actual flow (solid line) to a connecting circuit output as a demand for flow (dotted line) is increased linearly with time in an arrangement in which up to 8 pump modules of the same capacity are available for connection to a connecting circuit output. At time zero, 4 pump modules are connected to the connecting circuit output. In this example, there is already a sufficient demand for flow to one or more other connecting circuit outputs that when the demand exceeds the maximum capacity (dashed line) for 4 pump modules, at time t1, the actual flow remains at the maximum capacity of 4 pump modules and drops behind the demanded flow. As the demanded flow increases, at time t2, the demand, relative to other competing demands, is sufficient that the controller decides to connect a $5^{th}$ pump module to the connecting circuit input, causing the capacity to increase in a step. At this point it can be seen that the solid line showing actual flow jumps suddenly as it becomes possible for the 5 pump modules, operating below maximum combined flow, to accurately meet the demand. It is this jump which can cause vibrations, juddering and control difficulties. As shown in FIG. 18A, the actual displacement will again be limited by capacity at time t3 and then jump up again at time t4 when a $6^{th}$ pump module is allocated.

In a first approach, we have found that these jumps in displacement can be avoided by scaling down the demand signals by multiplying them by a scaling factor once the total demand exceeds a threshold.

The threshold is once the sum of the demand exceeds (a) the maximum displacement of all of the pump modules apart from one.

The scaling factor is such that the sum of the demands does not exceed (a) the maximum displacement of all of the pump modules apart from one. This is a fraction of the maximum possible displacement equal to (a) the maximum displacement of all of the pump modules apart from one divided by (c) the maximum displacement of all of the pump modules (assuming that all of the pump modules can be connected to either output).

In this example where there are 8 pump modules with the same maximum displacement, this has the effect that if the sum of the demands exceeds 7/8 of the maximum displacement, the sum of the scaled back demands does not exceed 7/8 of the maximum displacement.

The scaling factor is therefore (a) the maximum displacement of all of the pump modules apart from one divided by (b) the sum of the demands.

Figure 18B:
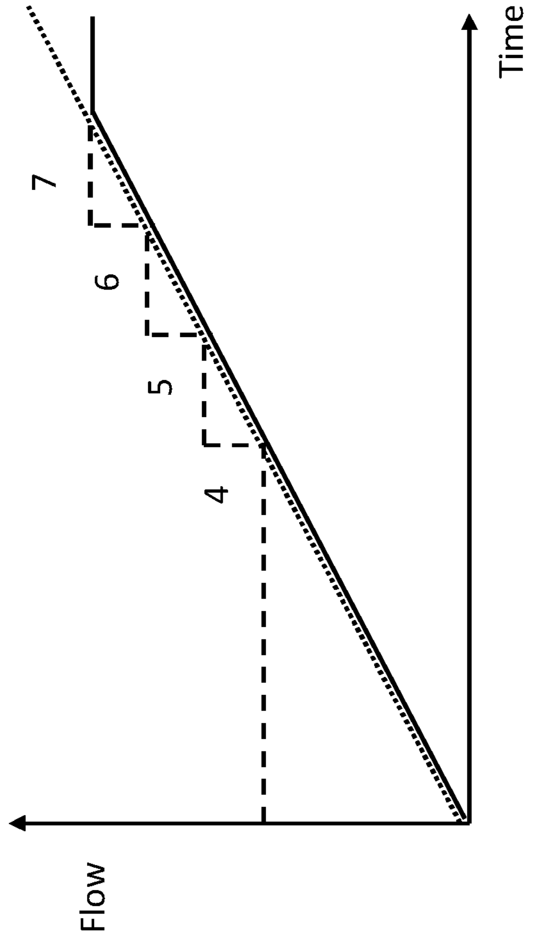
FIG. 18B corresponds to FIG. 18A while restricting the demand signals for individual outputs.

Once the demand is scaled in this way then, as shown in FIG. 18B, which shows a scaled down demand, not only do the scaled demands signals never exceed the available capacity, there are no sudden jumps in displacement as additional pump modules are connected to the connecting circuit output.

This applies especially when each connecting circuit output/hydraulic circuit portion is allocated a fraction of available pump modules which is proportional to the demand for hydraulic fluid for that output/hydraulic circuit portion, typically rounded up to the nearest integer.

Figure 19:
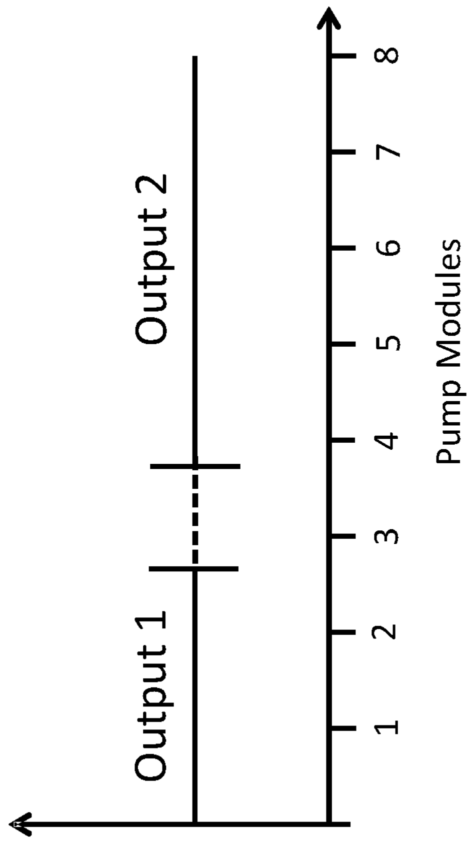
FIG. 19 is a schematic diagram of flow being met by first and second hydraulic circuit portions/connecting circuit outputs in a first approach.

With reference to FIG. 19, the effect of scaling by the said ratio is that effectively a displacement equal to the capacity of one of the pump modules is never used. In this image, the line labelled Output 1 is the scaled back demand signal for one of two connecting circuit outputs, the line labelled Output 2 is the scaled back demand signal allocated to the other of two connecting circuit outputs and the dashed line is unused capacity of the machine, which is the capacity of one pump module. At the precise position shown, 3 pump modules are connected to Output 1 and 5 pump modules are connected to Output 2 and the maximum displacement of either output is not exceeded. Although this does reduce maximum capacity, the discontinuities in displacement are avoided.

Worked Example—First Approach

A pump has 24 working chambers, grouped into 8 pump modules, each formed of 3 working chambers with a common high pressure manifold. Half of the working chambers and pump modules are located within one housing and half within another and the working chambers have a common shaft. The maximum displacement of each pump module is 24 cc per revolution of the rotatable shaft of the pump and so the total maximum displacement of the machine is 192 cc per revolution. The 8 pump modules can be connected through the connecting circuit to either of two connecting circuit outputs (or hydraulic circuit portions).

The capacity of one pump module is not used and demands are scaled back where required so that the sum of the demands cannot exceed $7/8\times192=168$ cc/rev (the threshold). This equates to multiplying the individual demands by 168 cc/rev divided by the sum of the demands when the demands are for more than the total displacement which can be output by all but one of the pump modules in combination.

In an example during operation, the demands for output are 100 cc/rev for output 1 and 150 cc/rev for output 2, 100 and 150 are 0.4 and 0.6 of the total demand. The sum of these demands is 250 cc/rev which exceeds the threshold of 168 cc/rev. Accordingly the demands are to be scaled down so that their sum is 168 cc/rev.

The total available pump capacity is divided proportionally between each service and the scaled back demands are $0.4\times168$ cc/rev=67.2 cc/rev and $0.6\times168$ cc/rev=100.8 cc/rev respectively. This equates to having multiplied the original demands (100 cc/rev and 150 cc/rev) by 168 cc/250 cc=0.672.

Next, calculate the number of pump modules required to connect to each output is calculated by rounding up the demand divided by the capacity of each pump modules, thus 67.2/24 cc/rev=2.8 which rounds up to 3 pump modules, and 100.8/24 cc/rev=4.2 which rounds up to 5 pump modules, respectively. As a check, these numbers should equal the total number of pump modules, 8.

This approach ensures that there is never a sudden increase in displacement arising from the connection of a new pump modules to an output. The scaled demand is never saturated.

In a further sophistication to the above method, illustrated with reference to FIGS. 20A through 20F, each connecting circuit output (whether to a hydraulic circuit portion and/or a group of one or more actuators) is allocated a minimum fraction of the available pump module capacity (or a minimum fraction of the available pump modules when they have the same capacity) equal to the reciprocal of the number of connecting circuit outputs. This applies when the demands are sufficiently high, e.g. for more than the total possible displacement, or where each demand exceeds the reciprocal of the number of connecting circuit outputs of the maximum possible displacement. Typically this second approach is only applied at higher demands than trigger the first approach and there can be a demand region in between where only the first approach is applied or there is a transition approach.

Worked Examples—Second Approach

In the following worked examples there are two outputs and eight pump modules, each of which has a capacity of 24 cc/rev.

Figure 20A:
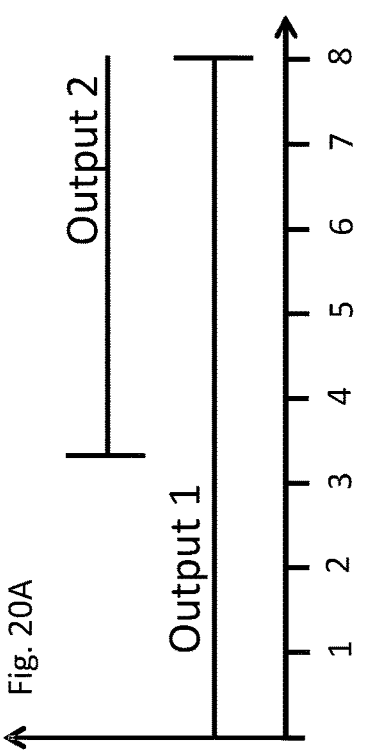
FIGS. 20A, 20B and 20C are schematic diagrams of demanded flow for first and second outputs in a second approach, with the x axis representing demand in units of the capacity of an individual pump modules, with both first and second demands exceeding 50% of maximum displacement (FIG. 20A), with the second demand reduced to just under 50% of maximum displacement (FIG. 20B) and with the second demand further reduced (FIG. 20C), without demand restriction, and FIGS. 20D, 20E and 20F correspond to FIGS. 20A, 20B and 20C but with the demands being restricted.
Figure 20B:
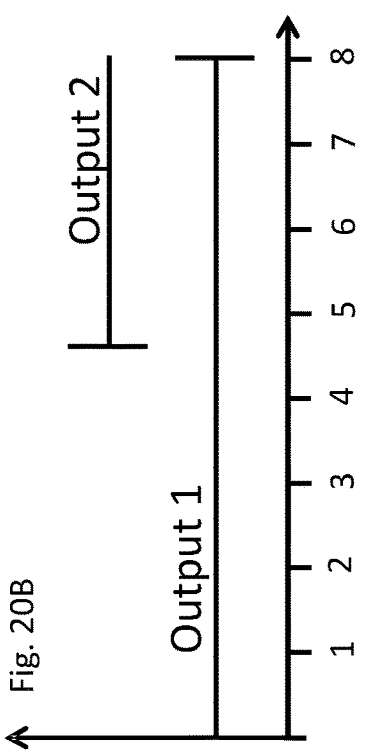
Figure 20C:
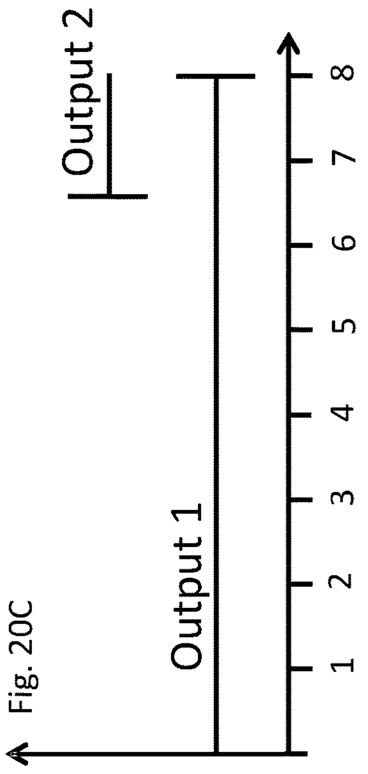
Figure 20D:
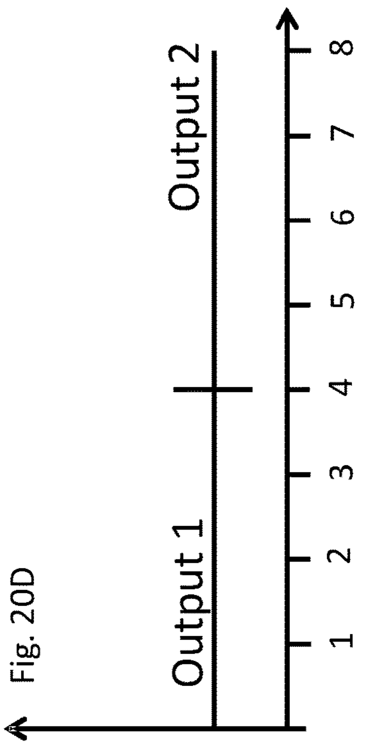

In a first example illustrated in FIGS. 20A and 20D, the first demand (labelled output 1) and second demand (labelled output 2) are both for more than half of the available displacement, indeed the first demand alone is for the entire available displacement. Each of the two outputs is allocated 100/2%=50% of the available capacity and so allocated 4 pump modules, with the first and second demands scaled back to 50% of the total available displacement.

Figure 20E:
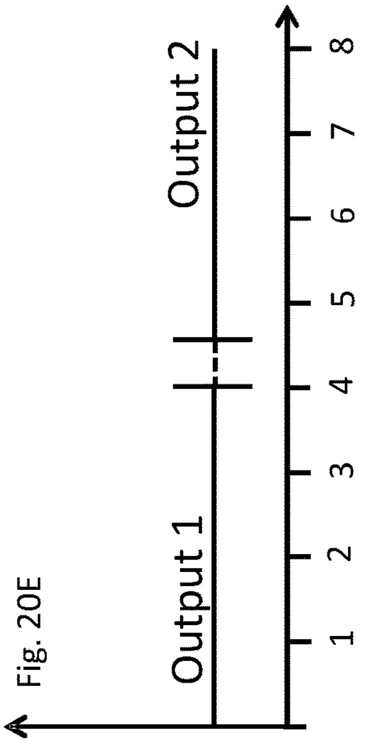

In a second example illustrated in FIGS. 20B and 20E, the first demand (output 1) is again for more than half of the available displacement but now the second demand (output 2) is for less than half of the available displacement. The first output is allocated 100/n=50% of the available capacity, and so allocated 8/2=4 pump modules. The second output is allocated the remainder of the capacity, and so is also allocated 4 pump modules. The dashed line in FIG. 20E shows a small amount of lost capacity.

Figure 20F:
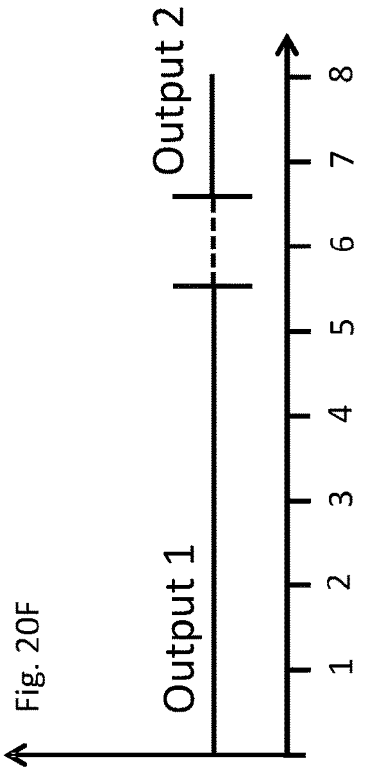

In a third example illustrated in FIGS. 20C and 20F, the first demand (output 1) is still high, the second demand is sufficiently low as to not require 8/2=4 pump modules in order to be met. In this case, the second output is allocated a sufficient number of pump modules to enable the full second demand to be met (2 in this case) and the remainder (6) are allocated the remaining pump modules.

In more detail, the allocation in the third example can be calculated by the following approach.

Demand for Output 1=192 cc/rev (full pump capacity, would require all 8 pump modules)

Demand for Output 2=36 cc/rev (well under half pump capacity, can be achieved with 1.5 pump modules)

Demand Total=228 cc/rev

Output 1 demand is processed using the following algorithm:

IF (36 cc/rev<(0.5$n$−1)*24 cc/rev)[statement is true]

Output 1 displacement allocation=MIN(192 cc/rev, 192 cc/rev−24 cc/rev−36 cc/rev)=132 cc/rev

ELSE

Output 1 displacement allocation=MIN(Output 1 Demand,equal fraction of maximum output capacity)

Output 2 demand is processed as follows:

IF (192 cc/rev<(0.5$n$−1)*24 cc/rev)[statement not true]

Output 2 displacement allocation=MIN(Output 2 demand,Total pump capacity-1−Output 1 demand)

ELSE

Output 2 displacement allocation=MIN(36 cc/rev,96 cc/rev)=36 cc/rev

Thus the demand for output 1 is scaled to 132 cc/rev and output 1 is allocated 6 pump modules and the demand for output 2 is maintained and output 2 is allocated 2 pump modules.

This, each output has been allocated pump modules capable of providing as a minimum an equal fraction of total displacement capacity when it has a demand for at least an equal fraction of the total displacement capacity, and may be allocated more if the other demands allow.

The benefits of implementing this second, guaranteed fraction approach (guaranteed half in the case of two outputs), in combination with the first approach is that the pump's full capacity can be used more of the time, resulting in faster operation (faster duty cycle times). It will also greatly reduce the number of switching cycles required from the connecting circuit valves, resulting in an increased service life of the system. The downside is some loss of controllability when compared with the first strategy.

The invention claimed is:

1. An apparatus comprising:

first and second hydraulic circuit portions, the first hydraulic circuit portion having a first hydraulic circuit portion input, and a plurality of valves configured to regulate the flow of hydraulic fluid from the first hydraulic circuit portion input to each of a first group of at least two hydraulic actuators, the second hydraulic circuit portion having a second hydraulic circuit portion input, and a plurality of valves configured to regulate the flow of hydraulic fluid from the second hydraulic circuit portion input to each of a second group of at least two hydraulic actuators, a prime mover, a hydraulic machine having a rotatable shaft in driven engagement with the prime mover and comprising at least three working chambers having a volume which varies cyclically with rotation of the rotatable shaft, each working chamber of the hydraulic machine comprising a low-pressure valve which regulates the flow of hydraulic fluid between the working chamber and a low-pressure manifold and a high-pressure valve which regulates the flow of hydraulic fluid between the working chamber and a high-pressure manifold, wherein the working chambers are formed into a plurality of pump modules each pump module comprising a group of one or more of the working chambers and a high-pressure manifold which is common to each working chamber in the group, a hydraulic connecting circuit comprising a plurality of connecting circuit inputs, each of which is in fluid communication with the high-pressure manifold of a respective pump module, a first connecting circuit output in fluid communication with the first hydraulic circuit portion and a second connecting circuit output in fluid communication with the second hydraulic circuit portion input, the hydraulic connecting circuit configured to connect each said connecting circuit input to a said connecting circuit output and comprising a plurality of valves which are switchable to change the connecting circuit output to which a said connecting circuit input is connected, so that each pump module is connected to one hydraulic circuit portion at a time and that for some or all of the pump modules, the hydraulic circuit portion to which the respective pump module is connected may be changed, a controller configured to actively control at least the low pressure valves of the said working chambers to determine the net displacement of each working chamber during each cycle of working chamber volume, and also the said valves, such that the net displacement of the working chambers of each pump module which are connected to the first hydraulic circuit portion is controlled in response to a first demand for hydraulic fluid of the first hydraulic circuit portion, and the net displacement of the working chambers of each pump module which are connected to the second hydraulic circuit portion is controlled in response to an independent second demand for hydraulic fluid of the second hydraulic portion.

2. An apparatus according to claim 1, wherein the first hydraulic circuit portion comprises a first valve block portion and the second hydraulic circuit portion comprises a second valve block portion, the two valve block portions being part of a metal block within which valves are located, and each of the first and second valve block portions each comprises a port which functions as the first or second hydraulic circuit portion input respectively.

3. An apparatus according to claim 1, wherein the said valves are diverting valves which are electronically controllable to connect the high-pressure port of a pump module exclusively to either the first connecting circuit output or to the second connecting circuit output.

4. An apparatus according to claim 1, wherein the controller controls at least the low pressure valves of the working chambers to determine whether each working chamber undergoes either an active cycle, with a net displacement of working fluid between the low-pressure manifold and the high-pressure manifold of the working chamber, or an inactive cycle, with no net displacement of working fluid between the low-pressure manifold and the high-pressure manifold of the working chamber, for each cycle of working chamber volume.

5. An apparatus according to claim 1, wherein the apparatus comprises one or more further hydraulic circuit portions, each further hydraulic circuit portion having a respective hydraulic circuit portion input, and one or more further hydraulic actuators, wherein the hydraulic connecting circuit further comprises, for each further hydraulic circuit portion, a further connecting circuit portion in fluid communication with the respective hydraulic circuit portion input, wherein the plurality of valves of the hydraulic connecting circuit are switchable to connect the high pressure manifold of each respective pump module to one or another of the connecting circuit outputs at a time.

6. An apparatus according to claim 1, wherein the circuit portions each include at least one proportional valve which is controllable to divert a proportion of working fluid received by the hydraulic circuit portion to one or more actuators.

7. An apparatus according to claim 6, wherein at least one of the first and second hydraulic circuit portions further comprises a hydraulic conduit which provides a pathway for hydraulic fluid to flow from the hydraulic circuit portion input to at least one actuator of the hydraulic circuit portion not through proportional valves of the hydraulic circuit portion, and a controllable bypass valve which selectively allows flow of fluid through the hydraulic conduit such that the said at least one actuator is selectively provided with hydraulic fluid from the hydraulic circuit portion input via at least one of one or more proportional valves and the hydraulic conduit.

8. An apparatus according to claim 1 wherein the apparatus is configured such that when a pump module is switched from being connected to one hydraulic circuit portion to another hydraulic circuit portion, the working chambers of the respective pump module are caused to carry out only inactive cycles while the valves are switched or the working chambers are not caused to start any active cycles.

9. An apparatus according to claim 1, wherein the high pressure manifold of some or all pump modules are connected to the first hydraulic circuit portion through a first valve and to the second hydraulic circuit portion through a second valve, wherein the controller staggers switching of the first and second valves, to avoid both being closed at the same time, wherein one of the first and second valves is a normally open valve and the other is a normally closed valve.

10. An apparatus according to claim 1, wherein the hydraulic connecting circuit comprises a conduit extending between the first and second connecting circuit outputs and having a plurality of fluid junctions along the length of the conduit, each junction connecting to a different connecting circuit input, and a plurality of blocking valves controllable to selectively block the conduit and thereby determine which connecting circuit inputs are connected to which connecting circuit outputs, wherein the conduit extends from the first connecting circuit output to the second output and back to the first connecting circuit output in a closed loop, with said junctions and blocking valves distributed around the loop.

11. An apparatus according to claim 1, wherein the hydraulic connecting circuit comprises a first manifold portion extending to the first connecting circuit output, a second manifold portion extending to the second connecting circuit output and a third manifold portion extending to a third connecting circuit output, connected to the input of a third hydraulic circuit portion comprising a third group of one or more actuators, and a switching manifold portion, wherein at least the first manifold portion, the second manifold portion, and the switching manifold portion are each selectively connectable to one or more said connecting circuit inputs through one or more valves, and wherein the hydraulic connecting circuit further comprises a manifold diverting valve which is controllable to connect the switching manifold portion to the first manifold portion or the third manifold portion.

12. An apparatus comprising:

a plurality of hydraulic actuators, a prime mover, a hydraulic machine having a rotatable shaft in driven engagement with the prime mover and comprising at least three working chambers having a volume which varies cyclically with rotation of the rotatable shaft, each working chamber of the hydraulic machine comprising a low-pressure valve which regulates the flow of hydraulic fluid between the working chamber and a low-pressure manifold and a high-pressure valve which regulates the flow of hydraulic fluid between the working chamber and a high-pressure manifold, wherein the working chambers are formed into a plurality of pump modules each of which has a respective high-pressure manifold which is common to the pump module, a hydraulic connecting circuit comprising a plurality of inputs, each of which is in fluid communication with the high-pressure manifold of a respective pump module, a plurality of connecting circuit outputs, each of which is in fluid communication with a different one or more of the hydraulic actuators, the hydraulic connecting circuit configured to connect each said connecting circuit input to a said connecting circuit output and comprising a plurality of valves which are switchable to change the connecting circuit output to which a said connecting circuit input is connected, so that each pump module is connected to one connecting circuit output at a time and thereby to the one or more of the hydraulic actuators which are in fluid communication with the respective connecting circuit output, a controller configured to actively control at least the low pressure valves of the said working chambers to determine the net displacement of each working chamber on each cycle of working chamber volume, such that the net displacement of the working chambers of each pump module which are connected to a respective connecting circuit output is controlled to meet a respective demand for hydraulic fluid by the one or more actuators in fluid communication with the respective connecting circuit output.

13. An apparatus according to claim 12, wherein the high pressure manifold of some or all pump modules are connected to a first connecting circuit output through a first valve and to a second connecting circuit output through a second valve, and wherein the controller staggers switching of the first and second valves, to avoid both being closed at the same time.

14. An apparatus according to claim 12, wherein the apparatus is configured such that when a pump module is switched from being connected to one connecting circuit output, the working chambers of the respective pump module are caused to carry out inactive cycles while the valves are switched.

15. A method of operating an apparatus, the apparatus comprising:

first and second hydraulic circuit portions, the first hydraulic circuit portion having a first hydraulic circuit portion input, and a plurality of valves configured to regulate the flow of hydraulic fluid from the first hydraulic circuit portion input to each of a first group of at least two hydraulic actuators, the second hydraulic circuit portion having a second hydraulic circuit portion input, and a plurality of valves configured to regulate the flow of hydraulic fluid from the second hydraulic circuit portion input to each of a second group of at least two hydraulic actuators, a prime mover, a hydraulic machine having a rotatable shaft in driven engagement with the prime mover and comprising at least three working chambers having a volume which varies cyclically with rotation of the rotatable shaft, each working chamber of the hydraulic machine comprising a low-pressure valve which regulates the flow of hydraulic fluid between the working chamber and a low-pressure manifold and a high-pressure valve which regulates the flow of hydraulic fluid between the working chamber and a high-pressure manifold, wherein the working chambers are formed into a plurality of pump modules each pump module comprising a group of one or more of the working chambers and a high-pressure manifold which is common to each working chamber in the group, a hydraulic connecting circuit comprising a plurality of connecting circuit inputs, each of which is in fluid communication with the high-pressure manifold of a respective pump module, a first connecting circuit output in fluid communication with the first hydraulic circuit portion and a second connecting circuit output in fluid communication with the second hydraulic circuit portion input, the hydraulic connecting circuit configured to connect each said connecting circuit input to a said connecting circuit output and comprising a plurality of valves which are switchable to change the connecting circuit output to which a said connecting circuit input is connected, so that each pump module is connected to one hydraulic circuit portion at a time and that for some or all of the pump modules, the hydraulic circuit portion to which the respective pump module is connected may be changed, the method comprising:

actively controlling at least the low pressure valves of the said working chambers to determine whether each working chamber undergoes either an active cycle, with a net displacement of working fluid between the low-pressure manifold and the high-pressure manifold of the working chamber, or an inactive cycle, with no net displacement of working fluid between the low-pressure manifold and the high-pressure manifold of the working chamber, and also the said valves, such that the net displacement of the working chambers of each pump module which are connected to the first hydraulic circuit portion is controlled in respond to a first demand for hydraulic fluid of the first hydraulic circuit portion and the net displacement of the working chambers of each pump module which are connected to the second hydraulic circuit portion is controlled in response to an independent second demand for hydraulic fluid of the second hydraulic circuit portion.

16. A method of operating an apparatus, the apparatus comprising:

a plurality of hydraulic actuators, a prime mover, a hydraulic machine having a rotatable shaft in driven engagement with the prime mover and comprising at least three working chambers having a volume which varies cyclically with rotation of the rotatable shaft, each working chamber of the hydraulic machine comprising a low-pressure valve which regulates the flow of hydraulic fluid between the working chamber and a low-pressure manifold and a high-pressure valve which regulates the flow of hydraulic fluid between the working chamber and a high-pressure manifold, wherein the working chambers are formed into a plurality of pump modules each of which has a respective high-pressure manifold which is common to that pump module, a hydraulic connecting circuit comprising a plurality of inputs, each of which is in fluid communication with the high-pressure manifold of a respective pump module, a plurality of connecting circuit outputs, each of which is in fluid communication with a different one or more of the hydraulic actuators, the hydraulic connecting circuit configured to connect each said connecting circuit input to a connecting circuit output and comprising a plurality of valves which are switchable to change the connecting circuit output to which a said connecting circuit input is connected, so that each pump module is connected to one connecting circuit output at a time and thereby to the one or more of the hydraulic actuators which are in fluid communication with the respective connecting circuit output, the method comprising actively controlling at least the low pressure valves of the said working chambers to determine the net displacement of each working chamber on each cycle of working chamber volume, such that the net displacement of the working chambers of each pump module which are connected to a respective actuator is controlled to meet a respective demand for hydraulic fluid by the one or more actuators in fluid communication with the respective connecting circuit output, and changing the connecting circuit output and thereby the one or more hydraulic actuators to which a pump module is connected by switching one or more valves of the hydraulic connecting circuit.

17. A method according to claim 16, wherein the demand signals are regulated to avoid a sudden increase, exceeding a threshold, in the displacement of working fluid to a hydraulic circuit portion or a connecting circuit portion responsive to changing the hydraulic circuit portion or connecting circuit output to which a pump module is connected.

18. A method according to claim 16, wherein at least when a plurality of demands for hydraulic fluid, relating to respective hydraulic circuit portions or the one or more actuators in fluid communication with respective connecting circuit outputs, are such that the plurality of demands cannot be met concurrently, irrespective of which pump modules are connected to which hydraulic circuit portions or connecting circuit outputs, some or all of the plurality of demands are reduced proportionately by multiplication by a scaling factor so that they are in total at most the maximum rate of displacement which is possible concurrently by all but one of the pump modules which can be connected to an individual hydraulic circuit or connecting circuit output.

19. A method according to claim 18, wherein the scaling factor is, or is at most, the ratio of (a) the maximum rate of displacement which is possible concurrently by all but one of the pump modules which can be connected to an individual hydraulic circuit or connecting circuit output, to (b) the sum of the plurality of demands.

20. A method according to claim 16, wherein there are n demands for hydraulic fluid for respective hydraulic circuit portions, or for or more actuators connected to respective connecting circuit outputs, and when the n demands are such that irrespective of which pump modules are connected to which connecting circuit outputs, the n demands cannot all be met concurrently, then if one of then demands are for more than (100/n) % of the maximum displacement of the pump modules which can be connected to the respective hydraulic circuit portion or connecting circuit output, then the respective hydraulic circuit portion or connecting circuit output has pump modules capable of delivering at least (100/n) % of the maximum displacement connected thereto, wherein n=2.

21. A method according to claim 20, wherein if one of the demands is for below (100/n) % of the maximum displacement of the pump modules but above a threshold, each hydraulic circuit portion or connecting circuit portion has pump modules capable of delivering at least (100/n) % of the maximum displacement connected thereto, wherein if one of the demands is below the threshold, the demands are scaled down such that they sum to at most the maximum rate of displacement which is possible by all but one pump module which can be connected to any of the hydraulic circuit portions or connecting circuit outputs.

* * * * *